(12) United States Patent
Shioda et al.

(10) Patent No.: US 7,418,203 B2
(45) Date of Patent: Aug. 26, 2008

(54) DIAGNOSIS METHOD FOR STANDBY SYSTEM OF OPTICAL RING NETWORK

(75) Inventors: Masahiro Shioda, Kawasaki (JP); Junji Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 505 days.

(21) Appl. No.: 10/879,141

(22) Filed: Jun. 30, 2004

(65) Prior Publication Data
US 2005/0169629 A1 Aug. 4, 2005

(30) Foreign Application Priority Data
Jan. 30, 2004 (JP) .............................. 2004-023959

(51) Int. Cl.
H04B 10/08 (2006.01)
H04B 17/00 (2006.01)
H04J 14/00 (2006.01)
H04J 1/16 (2006.01)
H04J 3/14 (2006.01)

(52) U.S. Cl. ................. 398/3; 398/9; 398/16; 370/222; 370/217; 370/241.1; 370/248

(58) Field of Classification Search .................... 398/3, 398/4, 9, 10, 16; 370/248, 249, 241.1, 217, 370/221–224
See application file for complete search history.

(56) References Cited

U.S. PATENT DOCUMENTS
5,327,275 A * 7/1994 Yamane et al. ................. 398/2

2002/0093712 A1* 7/2002 Fukashiro et al. ........... 359/128
2002/0097460 A1* 7/2002 Ikoma et al. ................. 359/110
2004/0228627 A1* 11/2004 Alana et al. ..................... 398/9

FOREIGN PATENT DOCUMENTS
JP 07-015757 1/1995

* cited by examiner

Primary Examiner—Jason Chan
Assistant Examiner—Nathan M. Curs
(74) Attorney, Agent, or Firm—Staas & Halsey LLP

(57) ABSTRACT

An object of the invention is to provide a diagnosis method for standby systems in an optical ring network having a redundant configuration, which can confirm normal states of standby systems in all optical transmission apparatuses on the network, even during operations of active systems. To this end, in the present diagnosis method for standby systems, when a diagnosis start command is given to an arbitrary optical transmission apparatus on the network, the optical transmission apparatus provides a false signal to a standby system unit to diagnoses an operation state thereof, and transmits the result to the optical transmission apparatus on the downstream side by utilizing overhead information in the active system optical channel. The optical transmission apparatus on the downstream side confirms a normal operation on the upstream side, thereafter, diagnoses the operation state of the standby system by utilizing the false signal, and updates the overhead information of the active system optical channel corresponding to the diagnosis result, to transmit the updated information to the optical transmission apparatus on the further downstream side. According to the overhead information of the active system optical channel, which has made a round of the ring network, normal operations of the standby system units in all optical transmission apparatuses on the network are confirmed, to thereby finish the standby system diagnosis.

11 Claims, 20 Drawing Sheets

CONFIGURATION EXAMPLE OF BLSR NETWORK

UNIT CONFIGURATION OF NE_A~D

FUNCTIONAL BLOCK DIAGRAM OF NE_A~D

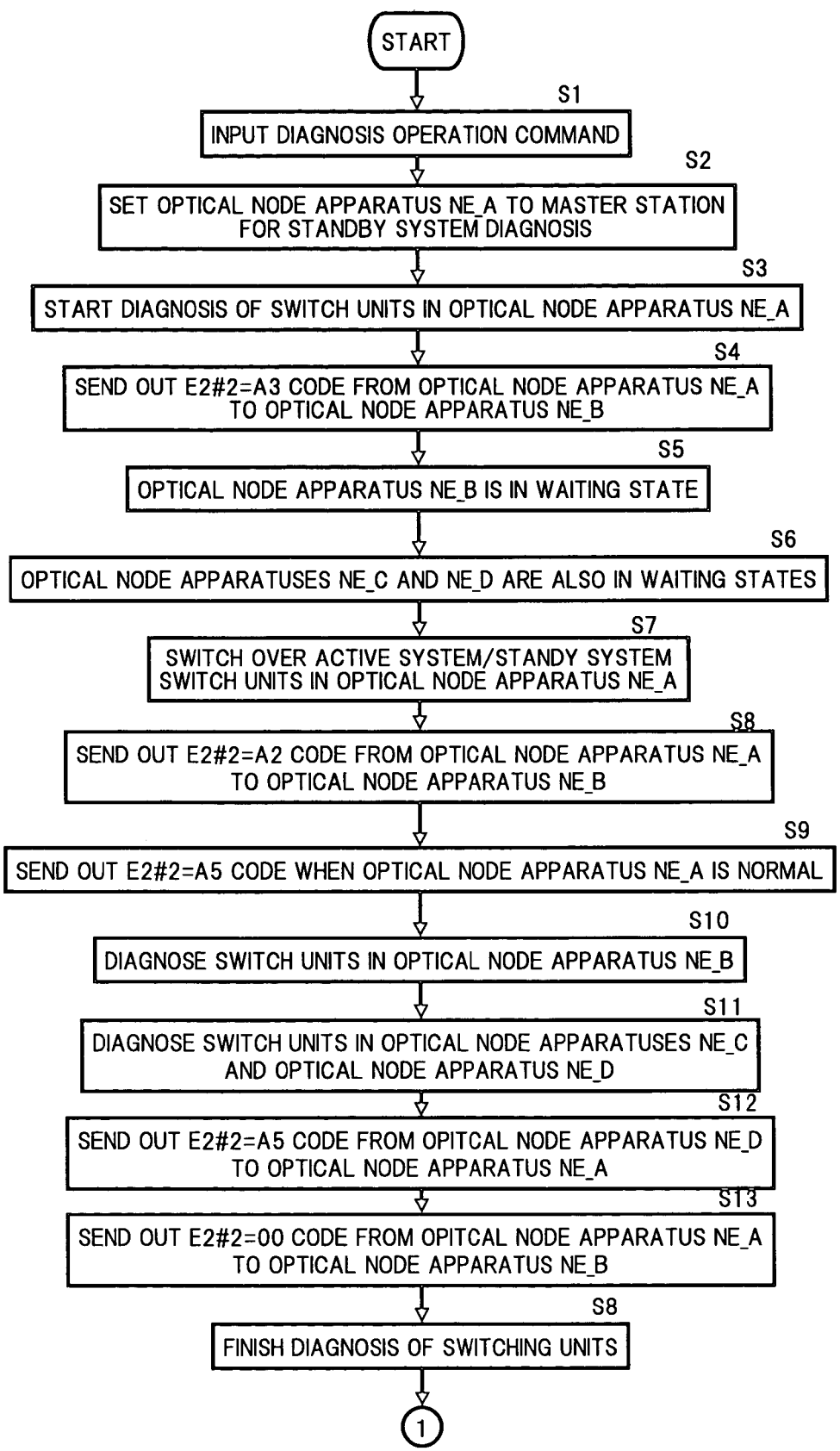

FIG.6

OPERATION EXAMPLES OF TOH E2#2 BYTE

| FUNCTION NAME | CODE | DESCRIPTION |
|---|---|---|
| UNDEFINED | OTHER THAN BELOW | NORMAL OPERATION STATE |
| DIAGNOSIS OF SWITCH UNIT | Axh | INDICATE FAILURE DETECTION STATE OF SWITCH UNIT |
| STATE A1 : WAITING | A1h | STATE OF WAITING FOR STATE A4/A5 CODE FROM ADJACENT NODE |
| STATE A2 : UNDER TEST - SLOT 1 | A2h | TEST STATE OF SLOT 1 SIDE |
| STATE A3 : UNDER TEST - SLOT 2 | A3h | TEST STATE OF SLOT 2 SIDE |
| STATE A4 : TEST FINISH - FAILURE | A4h | WHEN ANY OF SLOTS 1 AND 2 IS FAILED |
| STATE A5 : TEST FINISH - SUCCESS | A5h | WHEN BOTH OF SLOTS 1 AND 2 ARE SUCCEEDED |
| DIAGNOSIS OF INTERFACE UNIT | Bxh | INDICATE FAILURE DETECTION STATE OF STANDBY LINE |
| STATE B1 : WAITING | B2h | STATE OF WAITING FOR STATE B4/B5 CODE FROM ADJACENT NODE |
| STATE B2 : UNDER TEST | B3h | RECEIVED TEST SIGNAL, AND UNDER TESTING |
| STATE B4 : TEST FINISH - FAILURE | B4h | WHEN EITHER CH IS FAILED |
| STATE B5 : TEST FINISH - SUCCEEDED | B5h | WHEN ALL CHs ARE SUCCEEDED |
| FINISH DIAGNOSIS | Fxh | FINISH DIAGNOSIS |

USE EXAMPLE OF TOH E2#24-26

FIG. 17
EXAMPLE OF POH C2 BYTE

|    | C2 code | GR-253 Criteria | Diagnosis of Function |
|----|---------|-----------------|------------------------|
| 1  | 00      | Unequipped      | –                      |
| 2  | 01      | Equipped – Nonspecific Payload | – |
| 3  | 02      | VT-Structured STS-1 SPE | – |
| 4  | 03      | Locked VT Mode  | –                      |
| 5  | 04      | Asynchronous Mapping for DS3 | – |
| 6  | 12      | Asynchronous Mapping for DS4NA | – |
| 7  | 13      | Mapping for ATM | –                      |
| 8  | 14      | Mapping for DQDB | –                     |
| 9  | 15      | Asynchronous Mapping for FDDI | – |
| 10 | 16      | HDLC-Over-SONET Mapping | – |
| 11 | E1 – FB | Payload Defects Number | – |
| 12 | FC      | PDI Code        | –                      |
| 13 | FE      | 0.181 Test Signal (TSS1 to TSS3) Mapping | – |
| 14 | AA      | N/A             | Mapping for Test Signals |

FIG. 18

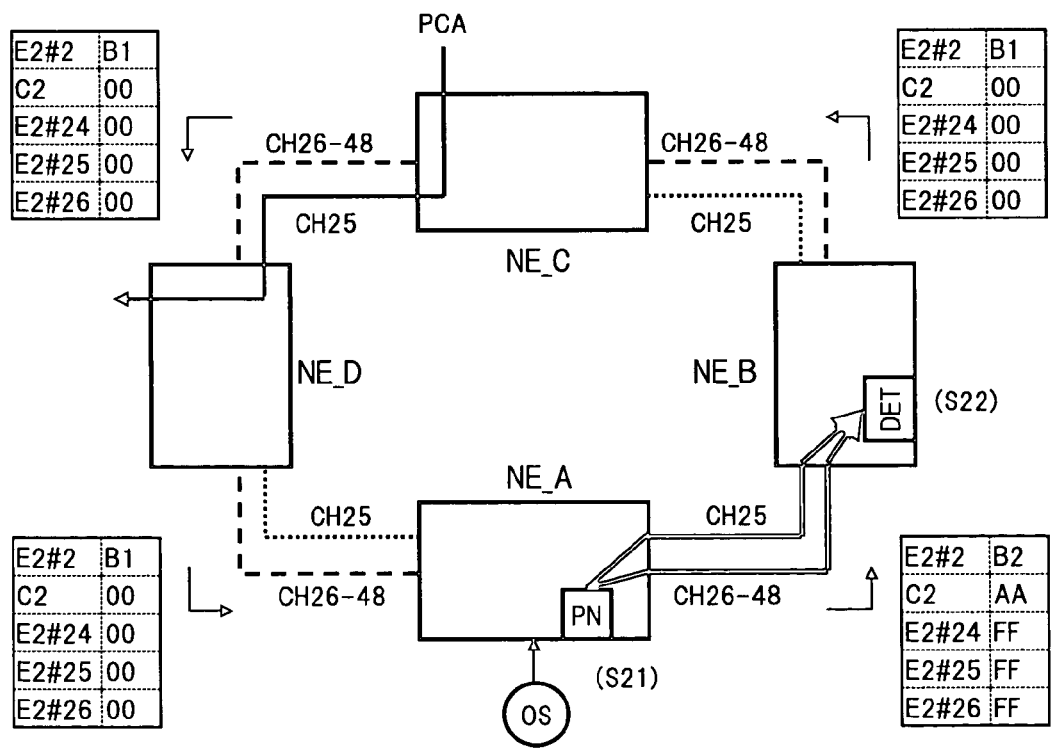

DIAGNOSIS METHOD FOR STANDBY SYSTEM OF OPTICAL RING NETWORK

BACKGROUND OF THE INVENTION (1) Field of the Invention

The present invention relates to a technique for diagnosing whether or not optical lines and optical transmission apparatuses operate normally, in an optical ring network having a redundant configuration including an active system and a standby system. More specifically, the present invention relates to a method of diagnosing a state of the standby system during operation of the active system, and an optical ring network using the same.

(2) Description of the Related Art

For example, in an optical transmission apparatus corresponding to, such as, a synchronous optical network (SONET), which is known as one of the high-speed digital communication systems using optical fibers, line relief at the time of failure occurrence can be performed instantaneously, by using a redundant configuration including an active system and a standby system to transmit an optical signal.

The redundant configuration in an optical network constructed using such optical transmission apparatuses, has two main meanings. One is the redundancy of an optical fiber transmission line itself, and the other is the redundancy of a signal processor in the optical transmission apparatus. In the optical network having the redundant configuration, it is important to always confirm that the optical line and the optical transmission apparatus in the standby system are in normal states, in order to prepare for a situation in which a failure occurs in the optical line or the optical transmission apparatus in the active system.

However, in the conventional optical network, there is not provided a function for diagnosing the state of the standby system during operation of the active system. Therefore, after a failure has occurred in the active system, a relief function is activated on the standby system, and then, the states of the optical line and the optical transmission apparatus in the standby system are confirmed. As a result, even if the switching over from the active system to the standby system is performed, if a failure such as disconnection or breakdown has occurred in the standby system, an optical channel under operation cannot be actually relieved, thereby causing a problem.

In order to deal with such a problem, for example, a technique has been proposed for the optical transmission apparatus having the redundant configuration, in which at the time of confirming the state of the standby system, test data is sent to the standby system without affecting the communication with the active system, to confirm the normal operation of the standby system without switching between the active system and the standby system (refer to Japanese Unexamined Patent Publication No. 7-15757).

However, the diagnosis of the standby system in the conventional technique as mentioned above is performed in a state where the standby system is closed in each optical transmission apparatus constituting the optical network. Therefore, it is difficult to confirm the normal states of the optical line and the optical transmission apparatus in the standby system for the whole optical network. Particularly, in a ring type optical network such as a bidirectional line switched ring (BLSR) supported by the aforementioned SONET, if the normal state of the standby system is not confirmed at the level of the whole network, it is difficult to reliably relieve the optical channel under operation, at the time of failure occurrence in the active system.

Further, for example, in the case of an optical network employing a protection channel access (PCA) system which also passes data signals through the optical line in the standby system during the operation of the active system, to increase the transmission capacity, it is not easy to detect a failure in the standby system without interrupting the data signals transmitted through the PCA circuit during the normal operation. Therefore, the detection of failure in the standby system becomes more difficult.

SUMMARY OF THE INVENTION

The present invention has been accomplished in view of the above problems and has an object of providing a diagnosis method for standby systems in an optical ring network having a redundant configuration, which can confirm normal states of standby systems in all optical transmission apparatuses on the network even when active systems are under operation, and an optical ring network using the diagnosis method for standby systems.

In order to achieve the above object, according to the present invention, there is provided a diagnosis method for standby systems, in an optical ring network comprising a plurality of optical transmission apparatuses each having a redundant configuration including an active system unit and a standby system unit, in which a plurality of optical transmission lines through which an active system optical channel and a standby system optical channel can be propagated, is used to connect adjacent optical transmission apparatuses, of the plurality of optical transmission apparatuses, to each other, to form a ring-shaped optical communication network, for diagnosing whether or not data transmission using the standby system optical channel can be performed normally, during data transmission between the respective optical transmission apparatuses using the active system optical channel, the method comprising the processes as shown in (1) to (4) below.

(1) A command for starting the standby system diagnosis is given to any one of the plurality of optical transmission apparatuses.

(2) The optical transmission apparatus having received the command in (1) generates a false signal different from a data signal under operation in its own apparatus, provides the false signal to the standby system unit in its own apparatus, detects based on a transmission state of the false signal whether or not the standby system unit is normally operating, and transmits information indicating the detection result to the optical transmission apparatus on the downstream side, by utilizing a predetermined region in the active system optical channel under operation.

(3) The optical transmission apparatus on the downstream side generates the false signal in its own apparatus, after confirming that the standby system unit in the optical transmission apparatus on the upstream side is normally operating, according to data in the predetermined region in the active system optical channel, provides the false signal to the standby system unit in its own apparatus, detects based on the transmission state of the false signal whether or not the standby system unit is normally operating, updates the data in the predetermined region in the active system optical channel under operation corresponding to the detection result, and transmits the data to the optical transmission apparatus on the further downstream side.

(4) The optical transmission apparatus having received the command in (1) confirms normal operations of the standby system units in all optical transmission apparatuses on the ring network, according to the data in the predetermined region in the active system optical channel, which has made a round of the ring network, and outputs information indicating the finish of the standby system diagnosis.

With such a diagnosis method for standby systems as described above, even during operation of the active system optical channel, the diagnosis of the standby system unit (failure detection) using the false signal is performed in each optical transmission apparatus on the ring network, to detect whether or not the standby system unit is normally operating, without affecting the data transmission by the active system optical channel. The diagnosis of the standby system unit in each optical transmission apparatus is sequentially performed such that the diagnosis of the standby system unit is started in the optical transmission apparatus given with the command in (1), to confirm the normal operation of the optical transmission apparatus on the upstream side by utilizing the data in the predetermined region in the active system optical channel, and then the diagnosis in the optical transmission apparatus on the downstream side is continued. Then, according to the data in the predetermined region in the active system optical channel, which has made a round of the ring network, the normal operations of all optical transmission apparatuses on the ring network can be confirmed in the optical transmission apparatus in which the diagnosis has been started.

According to the diagnosis method for standby systems of the present invention described above, it becomes possible to confirm the normal operations of the standby system units in all optical transmission apparatuses on the optical ring network, before a failure occurs in the active system. Further, by only giving a command for starting the diagnosis to an arbitrary optical transmission apparatus on the optical ring network, the standby system diagnosis for all optical transmission apparatuses on the ring network can be performed automatically. As a result, line relief at the time of failure occurrence in the optical ring network having the redundant configuration can be realized reliably and easily, thereby enabling improvement in the reliability of the optical ring network.

Other objects, features and advantages of the present invention will become apparent from the following description of one embodiment, with reference to the accompanying drawings.

BRIEF DESCRIPTION OF THE DRAWING

FIG. 5 is a first flowchart showing the flow of standby system diagnosis in the whole optical ring network in FIG. 1.

FIG. 6 is a diagram listing specific operation examples of E2 #2 byte in TOH utilized for the standby system diagnosis of the present invention.

FIG. 17 is a diagram showing a specific example of C2 code in POH utilized for the standby system diagnosis of the present invention.

FIG. 18 is a diagram schematically showing the state in steps 21 to 22 in FIG. 14.

DESCRIPTION OF THE PREFERRED EMBODIMENTS

Figure 1:
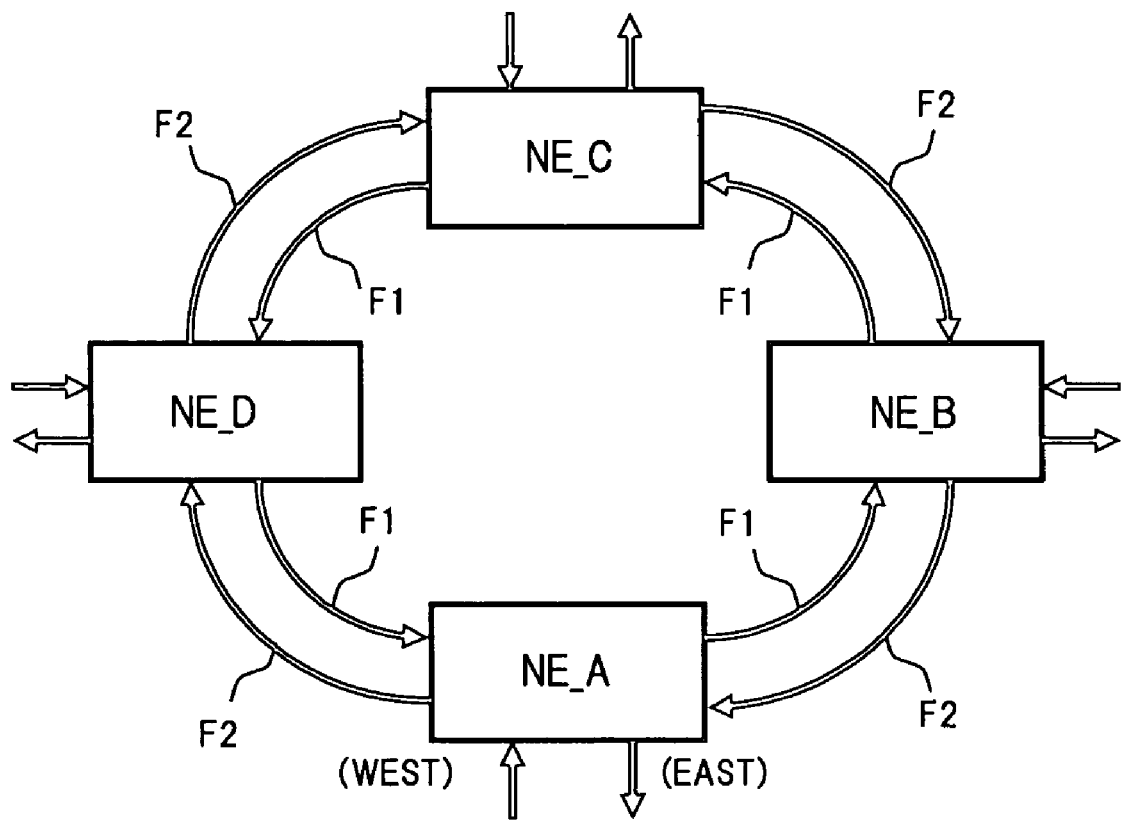
FIG. 1 is a block diagram showing one embodiment of an optical ring network, to which a diagnosis method for standby systems according to the present invention is applied.

Embodiments of the present invention will be described with reference to the accompanying drawings. In this description, same reference numerals denote same or corresponding parts throughout all figures.

Figure 2:
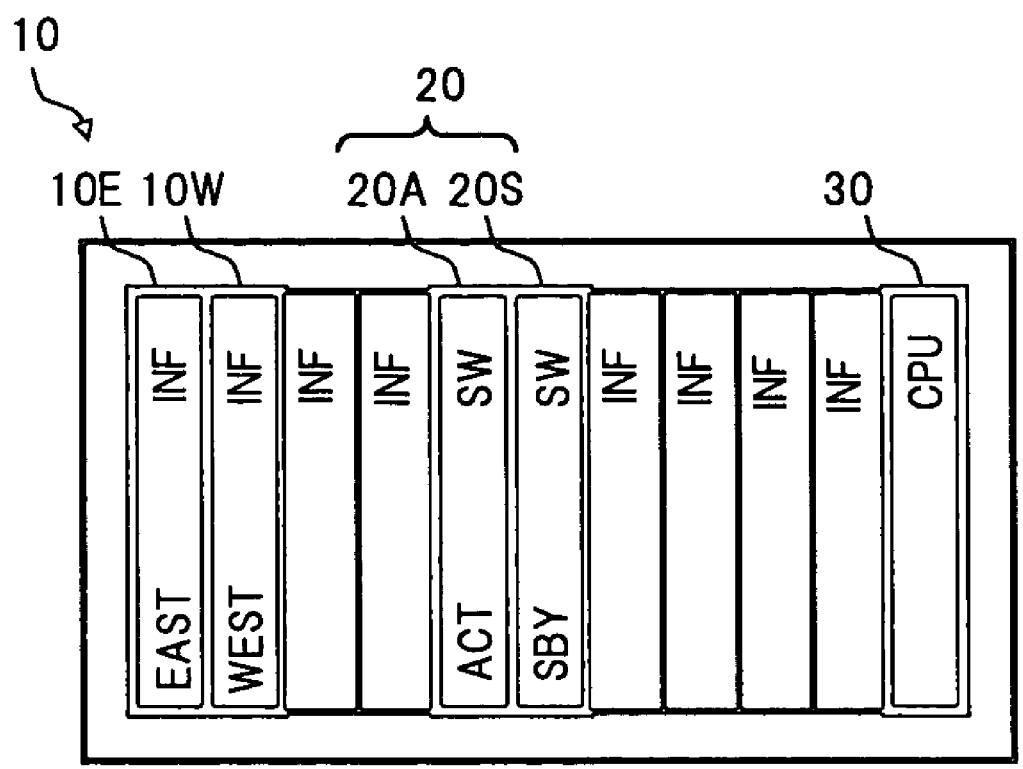
FIG. 2 is a diagram showing a unit configuration of an optical node apparatus in the optical ring network shown in FIG. 1.
Figure 3:
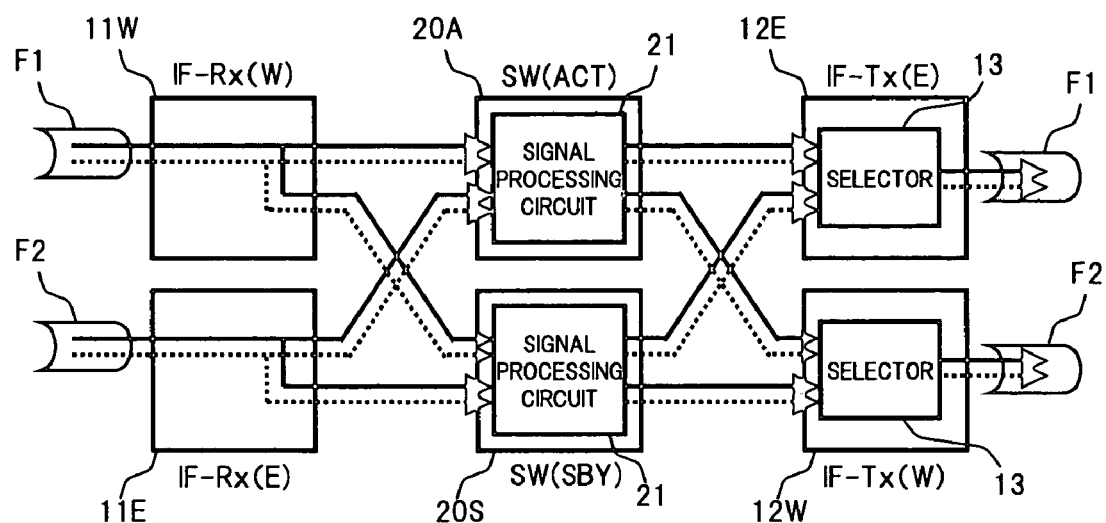
FIG. 3 is a specific functional block diagram of the optical node apparatus in FIG. 2.

FIG. 1 is a block diagram showing one embodiment of an optical ring network, to which a diagnosis method for standby systems according to the present invention is applied. FIG. 2 is a diagram showing a unit configuration of an optical transmission apparatus (optical node apparatus) provided in each node in the optical ring network shown in FIG. 1. Further, FIG. 3 is a specific functional block diagram of the optical node apparatus in FIG. 2.

In FIG. 1, the optical ring network, being an object of application of the diagnosis method for standby systems of the present invention, has a network configuration corresponding to the BLSR supported by, for example, the SONET. Specifically, the optical ring network includes, for example, four optical node apparatuses, NE_A, NE_B, NE_C and NE_D, and connects between adjacent optical node apparatuses NE_A to NE_D by using two optical fiber transmission lines F1 and F2 as optical transmission lines, to form a ring-shaped optical communication network. The respective optical node apparatuses NE_A to NE_D each have an interface that drops or adds an optical signal (optical channel) from or to the ring network, and the interface is connected to an optical fiber transmission line connected to the outside of the ring network. The configuration having four nodes is shown as an example here, but the number of nodes in the present invention is not limited thereto.

The optical fiber transmission line F1 forms a first ring that goes around the respective optical node apparatuses NE_A to NE_D, on which plurality of optical signals having different wavelengths are transmitted in one direction (for example, counterclockwise). Moreover, the optical fiber transmission line F2 forms a second ring, on which a plurality of optical signals having wavelengths different from those of the optical signals transmitted on the optical fiber transmission line F1 are transmitted in the opposite direction (for example, clockwise). Each transmission capacity of the optical fiber transmission lines F1 and F2 is divided for example into two, and one is used as an active system optical channel, and the other is used as a standby system optical channel.

The respective optical node apparatuses NE_A to NE_D each comprise, for example as shown in FIG. 2, a plurality of interface units (INF) 10, a switch unit (SW) 20 that controls the switching of connection state between the respective interface units 10, and a CPU 30 that performs a supervisory control of the switch unit 20.

The interface unit 10E enclosed by a thick line in FIG. 2, of the plurality of interface units 10, is a first interface that inputs/outputs optical signals to/from the optical fiber transmission lines F1 and F2 connected to one side of the optical node apparatus (here, the EAST side). The interface unit 10W is a second interface that inputs/outputs optical signals to/from the optical fiber transmission lines F1 and F2 connected to the other side of the optical node apparatus (here, the WEST side). The respective optical node apparatuses NE_A to NE_D are each provided with interface units corresponding to various functions (for example, a third interface that inputs/outputs optical signals to/from the optical fiber transmission line connected to the outside of the ring network, and the like), in addition to the interface units 10E and 10W corresponding to the ring network.

The interface unit 10E includes, as shown in the functional block diagram of FIG. 3, a reception interface section (IF-Rx) 11E that receives an optical signal from the optical fiber transmission line F2, and a transmission interface section (IF-Tx) 12E that transmits an optical signal to the optical fiber transmission line F1. Also, the interface unit 10W includes a reception interface section 11W that receives an optical signal from the optical fiber transmission line F1, and a transmission interface section 12W that transmits an optical signal to the optical fiber transmission line F2, similarly to the interface unit 10E.

The switch unit 20 has a redundant configuration, and comprises an active system switch unit 20A and a standby system switch unit 20S. As shown in the functional block diagram of FIG. 3, the switch units 20A and 20S are each provided with a signal processing circuit 21 for switching the connection states of the active system optical channel (arrow of solid line) and the standby system optical channel (arrow of broken line) between the reception interface sections 11E and 11W, and the transmission interface sections 12E and 12W. The transmission interface units 12E and 12W each include a selector 13 that selectively sends the active system optical channel and the standby system optical channel output from the respective switch units 20A and 20S to the optical fiber transmission lines F1 and F2.

Here, the switch unit 20 will be described in detail by way of a specific example.

Figure 4:
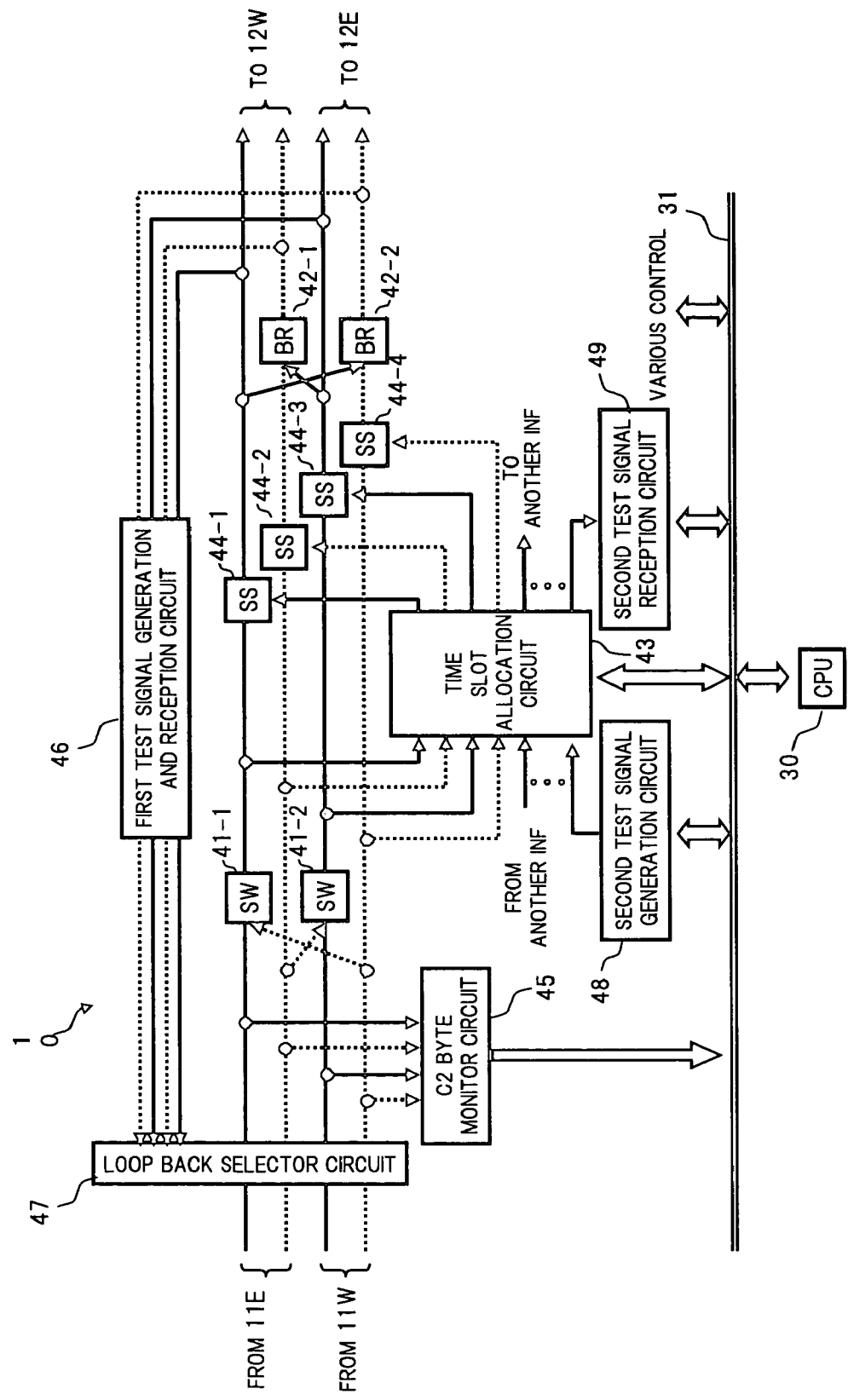
FIG. 4 is a diagram showing a specific configuration example of a switch unit used in the optical node apparatus in FIG. 2.

FIG. 4 is a diagram showing a specific configuration example of the switch unit used in each optical node apparatus. The switch unit 20 shown in FIG. 4 comprises switch circuits (SW) 41-1 and 41-2, a time slot allocation circuit 43, service selector circuits (SS) 44-1, 44-2, 44-3 and 44-4, and bridge circuits (BR) 42-1 and 42-2, which switch the connection of the active system optical channel and the standby system optical channel between the reception interface sections 11E and 11W, and the transmission interface sections 12E and 12W. Moreover, the switch unit 20 includes a first test signal generation and reception circuit 46, a loop back selector circuit 47, a second test signal generation circuit 48 and a second test signal reception circuit 49, for diagnosing operations of the respective circuits that execute the connection switching and for diagnosing whether or not the connection state between the respective circuits are normal. Further, the switch unit 20 includes a C2 byte monitor circuit 45 for detecting C2 byte included in a pass overhead (POH) of the optical signal output from the respective reception interface sections 11E and 11W. The respective circuits constituting the switch unit are interfaced with the CPU unit 30 via a CPU bus 31, and accordingly, various types of software processing described later are executed.

The switch circuit 41-1 is for selectively switching between the active system optical channel from the reception interface section 11E and the standby system optical channel from the reception interface section 11W, to send the optical channel to the transmission interface section 12W. Further, the switch circuit 41-2 is for selectively switching between the active system optical channel from the reception interface section 11W and the standby system optical channel from the reception interface section 11E, to send the optical channel to the transmission interface section 12E.

The time slot allocation circuit 43 and the service selector circuits 44-1 to 44-4 select whether the respective optical channels from the reception interface sections 11E and 11W are to be sent to the transmission interface sections 12E and 12W or to be dropped to another interface section connected to the outside of the ring network, in accordance with a control signal from the CPU unit 30, and also select whether the optical channel from another interface section or a second test signal from the second test signal generation circuit 48 is to be added toward the transmission interface sections 12E and 12W.

The bridge circuit 42-1 is for selectively switching over the optical channels output from the respective service selector circuits 44-2, 44-3 to send either one to the transmission interface section 12W. The bridge circuit 42-2 is for selectively switching over the optical channels output from the respective service selector circuits 44-1, 44-4 to send either one to the transmission interface section 12E.

The first test signal generation and reception circuit 46 generates a first test signal having for example a pseudo-random pattern (PN pattern) or the like, which is different from the optical signal transmitted on the network, in accordance with the control signal from the CPU unit 30, and gives the first test signal to respective signal lines between the reception interface sections 11E and 11W, and the transmission interface sections 12E and 12W, via the loop back selector circuit 47. Further, the first test signal generation and reception circuit 46 takes out to receive the first test signal that has been propagated through the respective signal lines between the reception interface sections 11E and 11W, and the transmission interface sections 12E and 12W, and transmits a signal indicating the reception state thereof to the CPU unit 30.

The second test signal generation circuit 48 generates a second test signal having for example the pseudo-random pattern (PN pattern) or the like, which is different from the optical signal transmitted on the network, in accordance with the control signal from the CPU unit 30, and gives the second test signal to the respective signal lines between the reception interface sections 11E and 11W, and the transmission interface sections 12E and 12W, via the time slot allocation circuit 43 and the service selector circuits 44-1 to 44-4.

The second test signal reception circuit 49 receives the second test signal looped back from the time slot allocation circuit 43 via the service selector circuits 44-1 to 44-4, the first test signal generation and reception circuit 46 and the loop back selector circuit 47 to the time slot allocation circuit 43, and transmits a signal indicating the reception state thereof to the CPU unit 30.

In the above configuration, the first test signal and the second test signal correspond to the false signal, and the first test signal generation and reception circuit 46 and the second test signal generation circuit 48 have a function as false signal transmission means. Moreover, the first test signal generation and reception circuit 46 and the second test signal reception circuit 49 have a function as false signal receiving means.

The C2 byte monitor circuit 45 monitors the C2 byte included in the pass overhead (POH) of the test signal transmitted at the time when a failure in the interface unit is detected, to send the monitor result to the CPU unit 30, as described below. The CPU unit 30 performs the reception connection setting (allocation of time slot) of the test signal transmitted from the optical node apparatus on the former stage, based on the value of the C2 byte.

Next is a description of an operation of the standby system diagnosis executed in the optical ring network.

FIG. 5 is a first flowchart showing the flow of standby system diagnosis in the whole optical ring network.

In the standby system diagnosis described above, at first in step 1 in FIG. 5 (shown by S1 in the figure, and similarly hereunder), a diagnosis operation command is input to an arbitrary optical node apparatus (here, for example, the optical node apparatus NE_A) by a network maintenance personnel. This diagnosis operation command is given to the CPU 30 in the optical node apparatus NE_A. As a result, in step 2, the optical node apparatus NE_A is set as a master station for the diagnosis operation. Subsequently, in step 3, the diagnosis (failure detection) is executed for each switch unit in each optical node apparatus on the ring network sequentially, for example, counterclockwise, that is, from the optical node apparatus NE_A, through the optical node apparatuses NE_B NE_C, to the optical node apparatus NE_D.

Specifically, in the optical node apparatus NE_A, which becomes the master station, first the failure detection is started for the standby system side, of the respective active system switch unit 20A and the standby system switch unit. As described below, in the present diagnosis processing, the switching between the active system switch unit and the standby system switch unit is performed halfway. Therefore, in the operation description below, one of the switch units 20 having the redundant configuration is designated as a slot 1 (SL1), and the other is designated as a slot 2 (SL2). In this case, in the above step 2, the switch unit on the slot 2 side in the optical node apparatus NE_A is set as a diagnosis target.

At the same time as with the above step 3, in step 4, information indicating a state where the diagnosis is performed for the slot 2 side of the switch units is transmitted to the optical node apparatus NE_B, by utilizing E2 #2 byte in a transport overhead (TOH) in the active system optical channel sent from the optical node apparatus NE_A to the optical node apparatus NE_B.

FIG. 6 is a diagram listing specific operation examples of E2 #2 byte in the TOH. In the operation examples, Axh (xh is an arbitrary numerical value expressed by a hexadecimal number) is allocated as a code indicating a state where an occurrence of failure is detected for the switch unit having the redundant configuration. Bxh is also allocated as a code indicating a state where the diagnosis is performed for the interface units to be described below and the standby system optical lines, and Fxh is allocated as a code indicating that a series of diagnosis processing has finished. For the Axh code, it is assumed that A1 indicates a waiting state, A2 indicates a state where the switch unit on the slot 1 side is under test, A3 indicates a state where the switch unit on the slot 2 side is under test, A4 indicates that either the slot 1 test or the slot 2 test is failed (a failure in the switch unit), and A5 indicates the success in the tests for the slot 1 and the slot 2 (normal state of the switch unit).

In such operation examples, in step 4, an optical signal in which E2 #2 byte in the TOH is set to A3 code is sent from the optical node apparatus NE_A to the optical node apparatus NE_B via the active system optical line.

Figure 7:
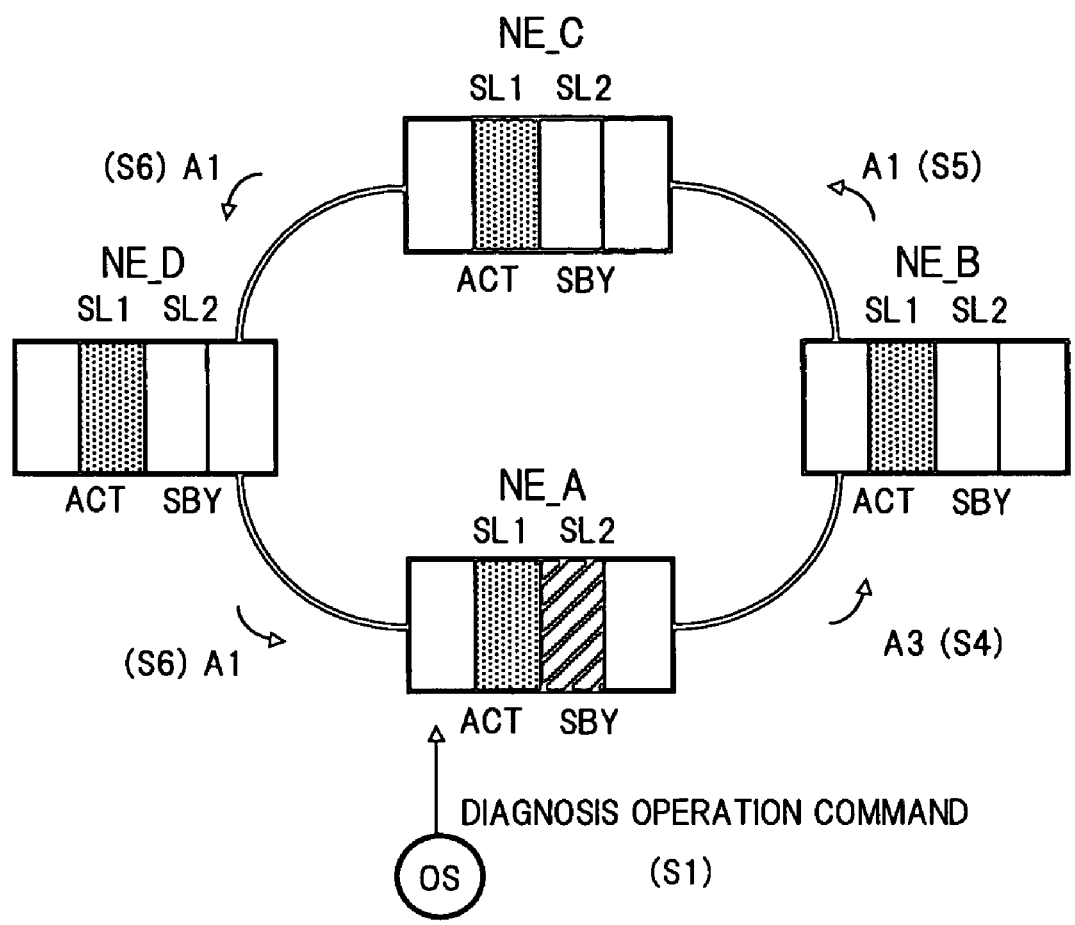
FIG. 7 is a diagram schematically showing the processing flow in steps 1 to 6 in FIG. 5.

In the optical node apparatus NE_B having received the optical signal from the optical node apparatus NE_A, in step 5, a value of E2 #2 byte in the TOH in the received light is detected, and the detection result is sent to the CPU unit 30, and the optical node apparatus NE_B become the waiting state. Moreover, E2 #2 byte in the TOH in the optical signal sent from the optical node apparatus NE_B to the optical node apparatus NE_C is set to A1 code indicating the waiting state. Subsequently, in step 6, in the same manner, the optical node apparatus on the latter stage recognizes that the optical node apparatus on the former stage is in the waiting state, to become the waiting state, and an optical signal indicating the waiting state is sent to the subsequent optical node apparatuses sequentially. FIG. 7 is a diagram schematically showing the flow in the series of processing of from steps 1 to 6. (S1) to (S6) shown in FIG. 7 correspond to steps 1 to 6 in the flowchart shown in FIG. 5.

Here, the failure detection operation for the standby system (slot 2) switch unit executed in the optical node apparatus NE_A will be described specifically. In the optical node apparatus NE_A, the CPU unit 30 having received the diagnosis operation command from the network maintenance personnel sends control signals to the respective circuits in the switch unit, so that the failure detection utilizing the first test signal and the failure detection utilizing the second test signal are executed sequentially. Specifically, the failure detection utilizing the first test signal is executed such that the first test signal generated by the first test signal generation and reception circuit 46 is given to the signal line on the standby system side by the loop back selector circuit 47. At this time, the service selector circuits 44-1 to 44-4 are each controlled to a through side, and the first test signal sent to the signal line on the standby system side from the loop back selector circuit 47 passes through the service selector circuits, to be looped back to the first test signal generation and reception circuit 46. The first test signal generation and reception circuit 46 receives the looped back first test signal, and receives a signal indicating the reception state thereof to the CPU unit 30. The CPU unit 30 judges the states of the signal line and the respective circuits on the standby system side according to the reception state of the first test signal, to detect the occurrence of disconnection, failure or the like.

In the above failure detection utilizing the first test signal, since the states of the signal lines and the respective circuits corresponding to the outside of the ring network are not detected, the failure detection utilizing the second test signal is performed subsequently. The failure detection based on the second test signal is executed such that the second test signal generated by the second test signal generation circuit 48 is sent to the time slot allocation circuit 43, to be given to the signal line on the standby system side via the service selector circuits 44-1 to 44-4 each controlled to an adding side. Then, the second test signal having passed through the first test signal generation and reception circuit 46 is looped back to the time slot allocation circuit 43 via the loop back selector circuit 47, and received by the second test signal reception circuit 49, and a signal indicating the reception state thereof is sent to the CPU unit 30. The CPU unit 30 judges the states of the signal lines and the respective circuits on the standby system side corresponding to the outside of the ring network, according to the reception state of the second test signal, to detect the occurrence of disconnection, failure or the like.

Figure 8:
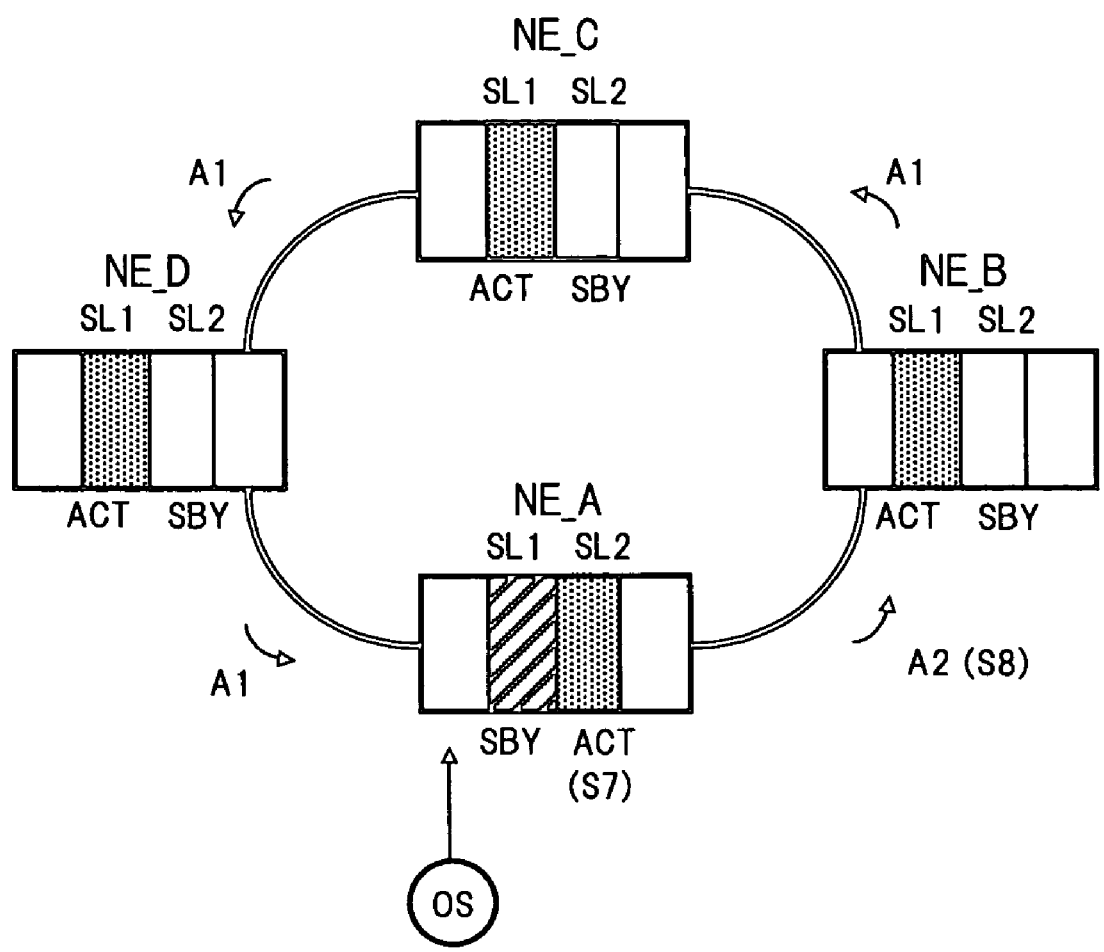
FIG. 8 is a diagram schematically showing the processing flow in steps 7 to 8 in FIG. 5.

When the failure detection for the switch unit on the slot 2 side in the optical node apparatus NE_A has finished as described in the above, then in step 7, the switching of the switch units in the active system and the standby system in the optical node apparatus NE_A is automatically performed under the control of the CPU unit 30. Then, the failure detection for the switch unit on the slot 1 side, which is switched from the active system to the standby system, is executed in a similar manner to the failure detection for the slot 2 side as described before. At this time, the value of E2 #2 byte in the TOH in the optical signal sent from the optical node apparatus NE_A to the optical node apparatus NE_B is set to A2 (step 8). Therefore, the optical node apparatus NE_B having received A2 code keeps the waiting state, and the subsequent optical node apparatuses NE_C and NE_D are also kept in the waiting states. FIG. 8 is a diagram schematically showing the processing flow in steps 7 to 8.

Figure 9:
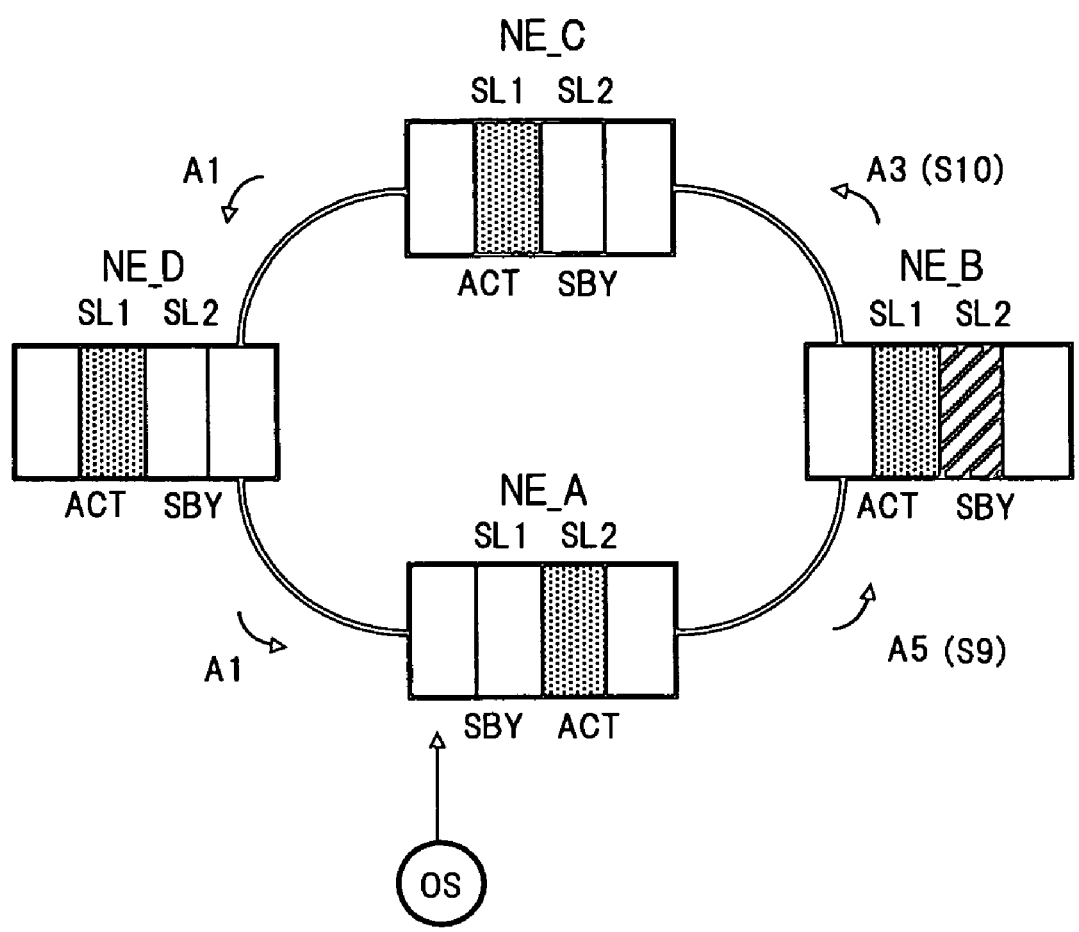
FIG. 9 is a diagram schematically showing the processing flow in steps 9 to 10 in FIG. 5.

According to the aforementioned processing in steps 1 to 8, the failure detection for the switch units in the optical node apparatus NE_A is finished, and when the normal states of the respective slots 1 and 2 are confirmed, then in step 9, an optical signal in which the value of E2 #2 byte in the TOH is set to A5 is sent from the optical node apparatus NE_A to the optical node apparatus NE_B. In the optical node apparatus NE_B having received the optical signal from the optical node apparatus NE_A, when it is detected that E2 #2 byte in the received light becomes A5, then in step 10, the failure detection for the switch unit of the slot 2 is started, as for the optical node apparatus NE_A described above. When the failure detection for the slot 2 is finished, the switching of the switch units is performed, and the failure detection for the slot 1 is executed. While the failure detection in the optical node apparatus NE_B is being performed, the optical node apparatuses NE_C and NE_D are kept in the waiting states. FIG. 9 is a diagram schematically showing the processing flow in steps 9 to 10. When the normal states of the switch units in the optical node apparatus NE_B are confirmed according to the processing in steps 9 and 10, the failure detection for the optical node apparatuses NE_C and NE_D is sequentially executed in accordance with the similar procedure (step 11).

Figure 10:
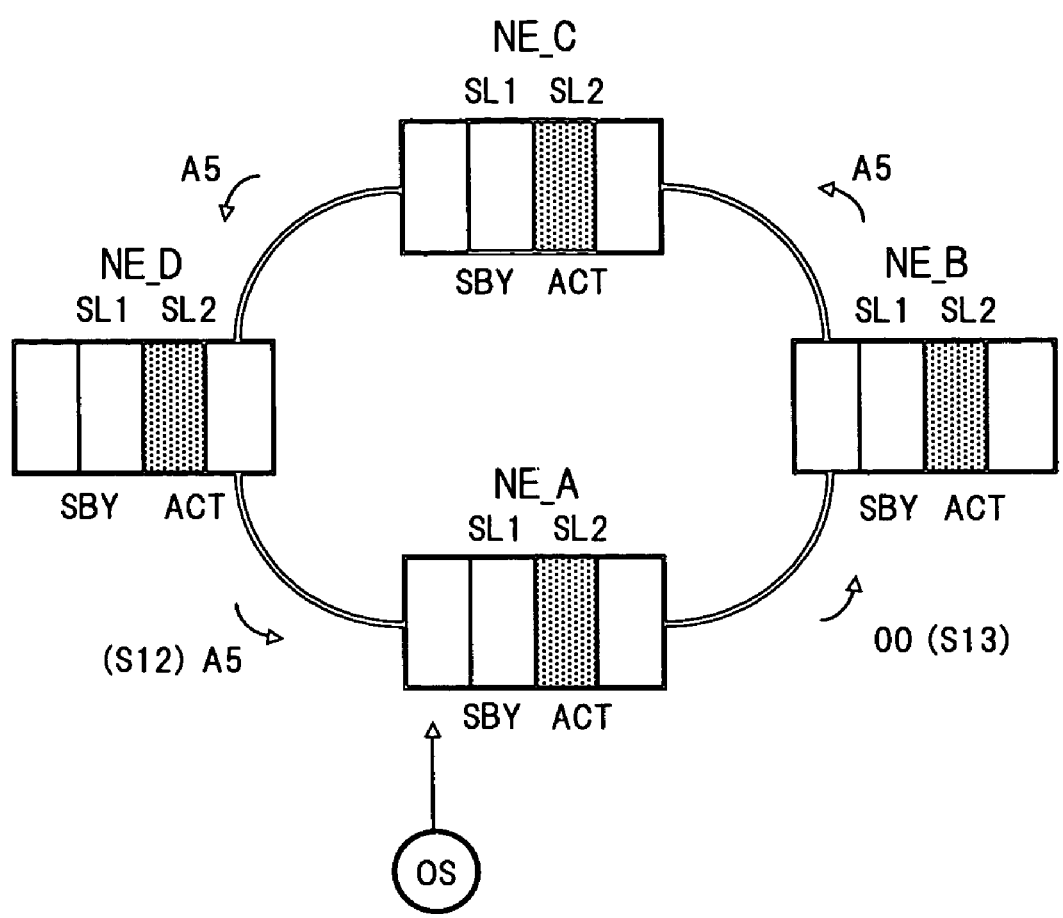
FIG. 10 is a diagram schematically showing the processing flow in steps 12 to 13 in FIG. 5.

Then, when the failure detection for the optical node apparatus NE_D is finished and the normal state of the switch unit is confirmed, in step 12, an optical signal in which the value of E2 #2 byte in the TOH is set to A5 is sent from the optical node apparatus NE_D to the optical node apparatus NE_A, being the master station. In the optical node apparatus NE_A having received the optical signal from the optical node apparatus NE_D, since E2 #2 in the received light becomes A5, the completion of the failure detection in each optical node apparatus on the ring network is judged, and in step 13, the optical signal in which E2 #2 byte in the TOH is set to 00 code in order to release the diagnosis state of the switch unit, is sent from the optical node apparatus NE_A to the optical node apparatus NE_B. FIG. 10 is a diagram schematically showing the processing flow in steps 12 to 13.

Figure 11:
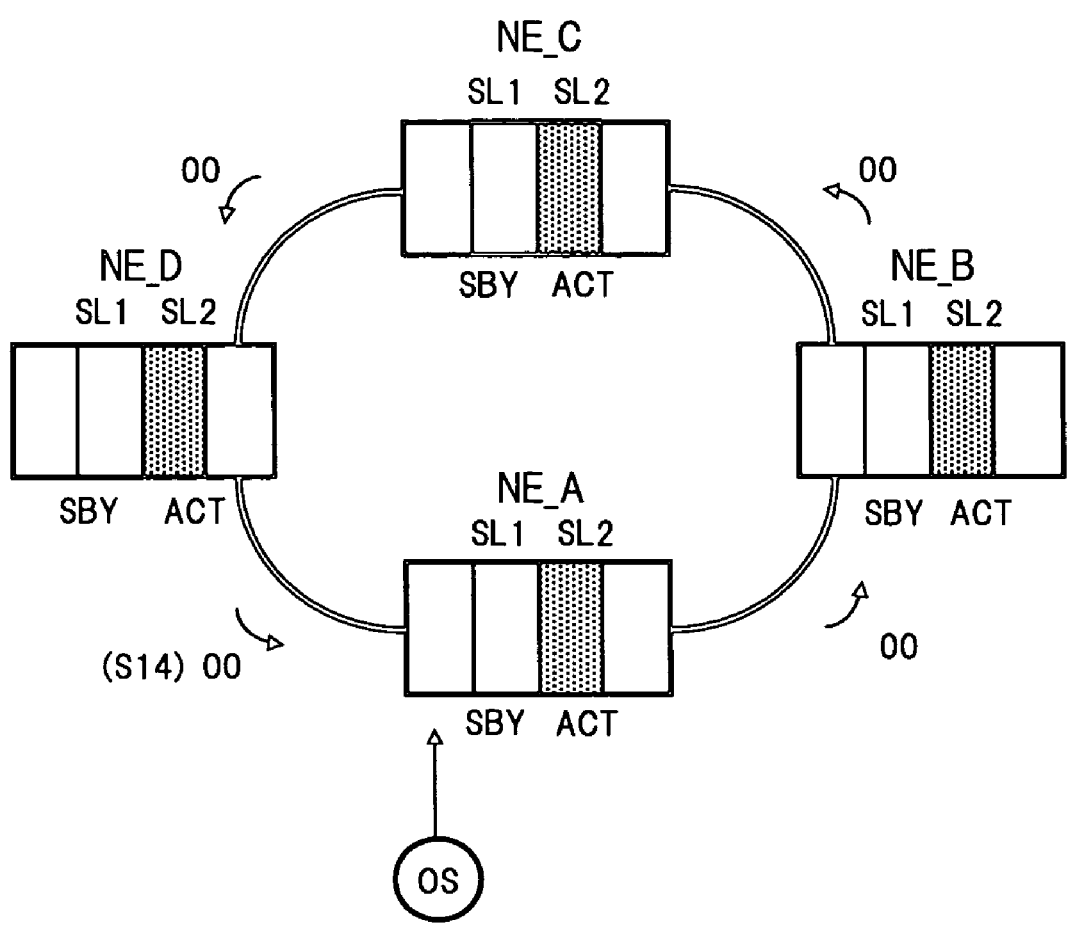
FIG. 11 is a diagram schematically showing the processing flow of step 14 in FIG. 5.

Then, in step 14, as shown in FIG. 11, the respective optical node apparatuses NE_B to NE_D each receive 00 code from the former stage side to sequentially transmit 00 code to the latter stage side, and finally 00 code is received by the optical node apparatus NE_A, being the master station. As a result, the diagnosis state of the switch units in the whole ring network is finished.

Figure 12:
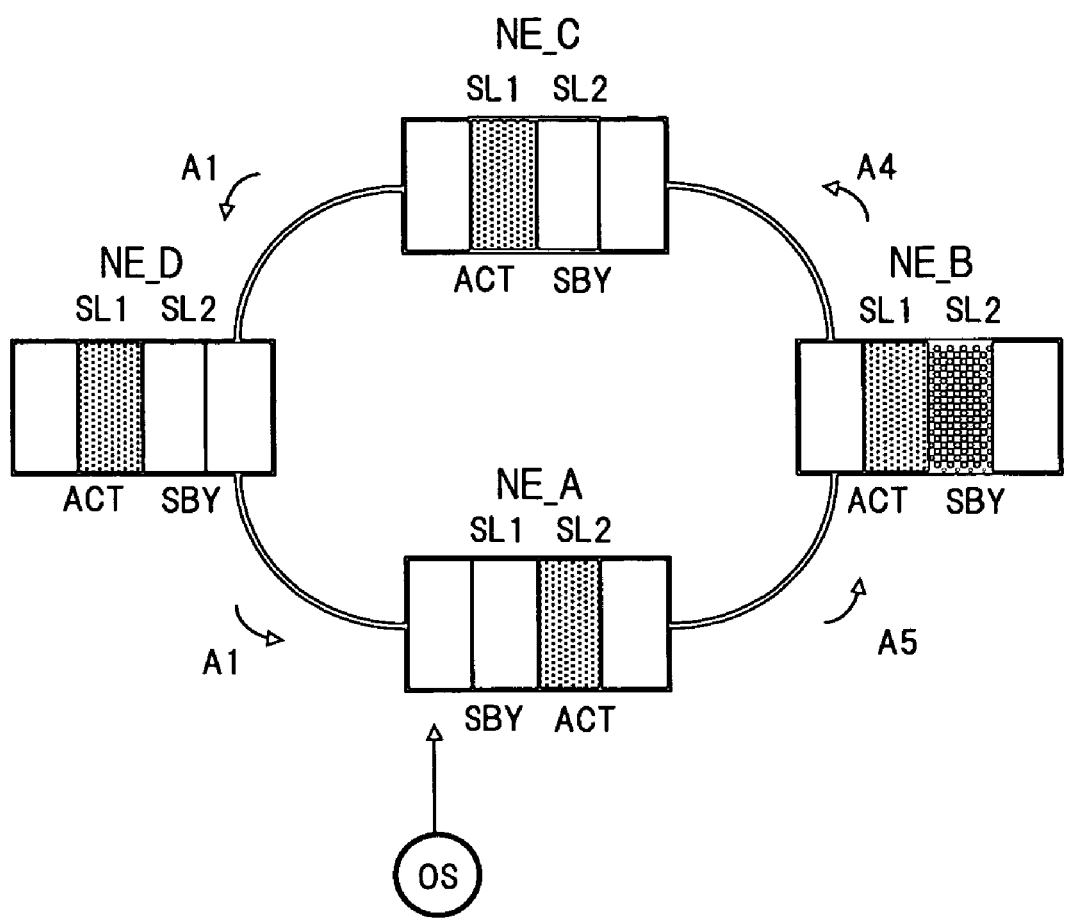
FIG. 12 is a first diagram schematically showing the processing flow, when an occurrence of failure is detected in the switch unit.
Figure 13:
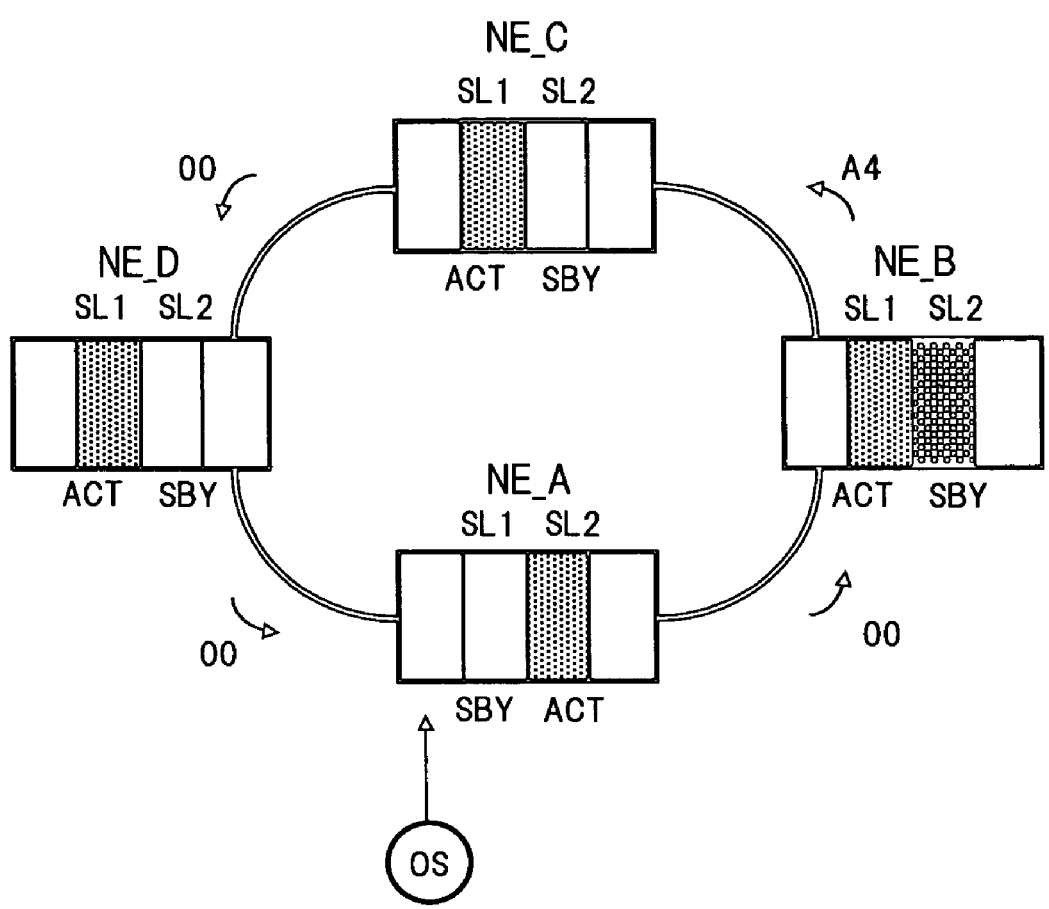
FIG. 13 is a second diagram schematically showing the processing flow, when the occurrence of failure is detected in the switch unit.

When a failure in the switch unit is detected in any one of the optical node apparatuses (here, for example, the optical node apparatus NE_B) on the ring network, an optical signal in which E2 #2 byte is set to A4 code at that time as shown in FIG. 12, is sent from the optical node apparatus NE_B to the optical node apparatus NE_C. Then, as shown in FIG. 13, the optical node apparatus NE_C having received A4 code from the optical node apparatus NE_B sends an optical signal in which E2 #2 byte is set to 00 code to the optical node apparatus NE_D, and subsequently, an optical signal in which E2 #2 byte is set to 00 code is sent also from the optical node apparatuses NE_D and NE_A as well. As a result, the diagnosis state of the switch units is finished, and from the optical node apparatus NE_B in which an occurrence of failure has been detected, a signal informing the occurrence of failure in the switch unit is issued to the network maintenance personnel.

Figure 14:
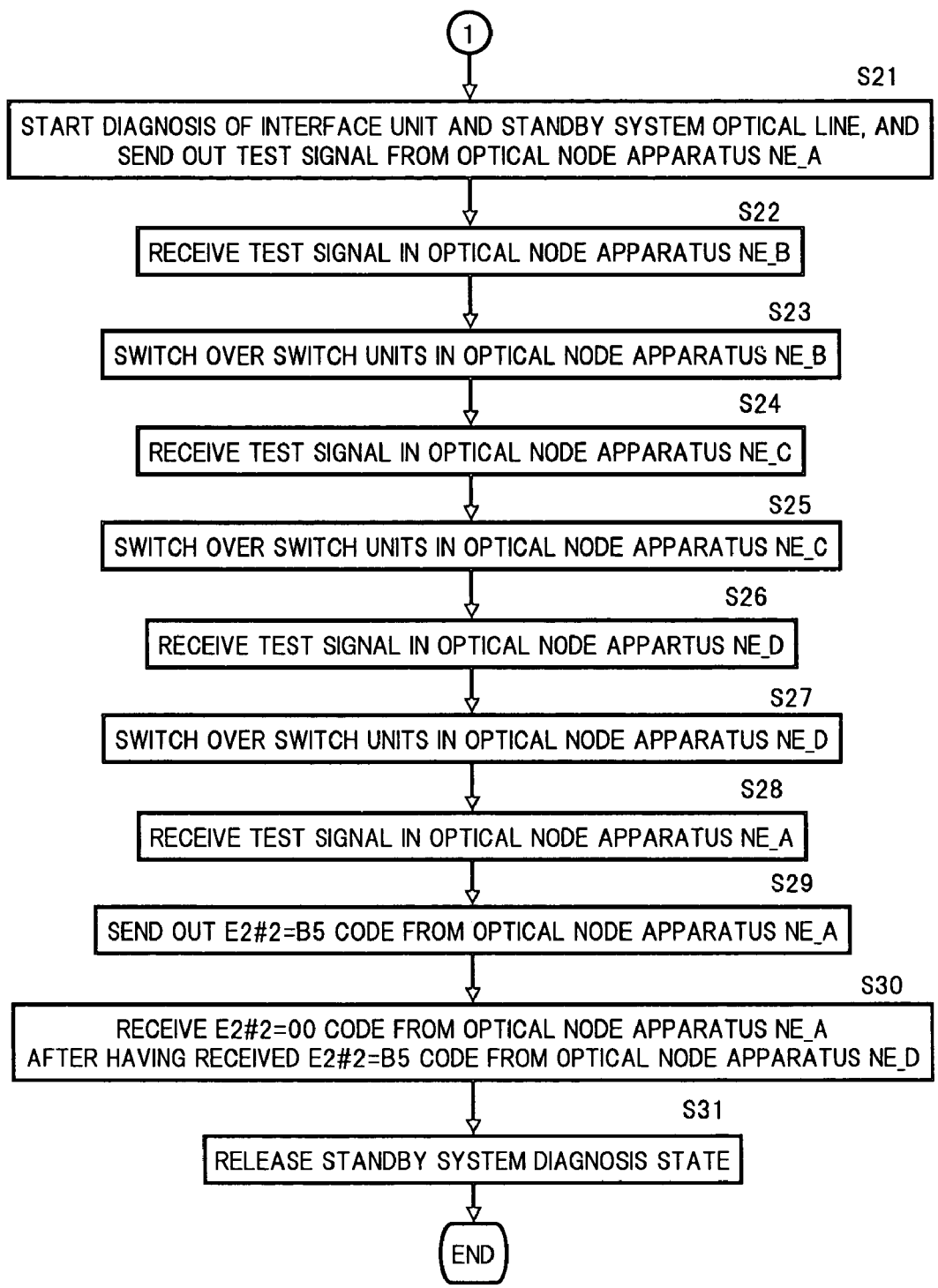
FIG. 14 is a second flowchart showing the flow of standby system diagnosis in the whole optical ring network in FIG. 1.

When the diagnosis of the switch units in the respective optical node apparatuses NE_A to NE_D on the ring network is finished, the diagnosis of the interface units and the standby system optical lines in the respective optical node apparatuses NE_A to NE_D is executed in accordance with a second flowchart shown in FIG. 14.

Figure 15:
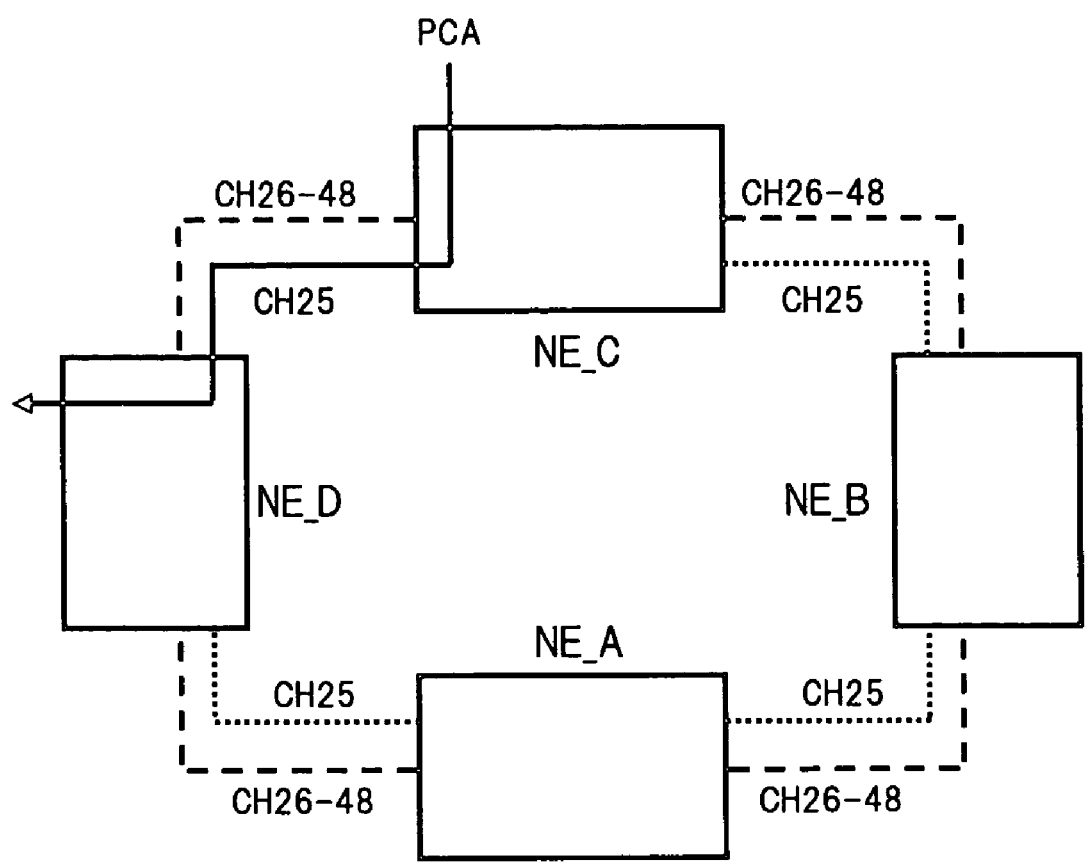
FIG. 15 is a diagram showing one example of data transmission according to a PCA system in the optical ring network in FIG. 1.

Here, for example, as shown in FIG. 15, assuming that the data transmission according to the PCA system is being performed by utilizing the standby system optical line between the optical node apparatuses NE_C and NE_D, the failure detection operation will be described. As a specific setting example, 24-wave optical channels CH1 to CH24 are allocated for the active system, and 24-wave optical channels CH25 to CH48 are allocated for the standby system in the counterclockwise ring, and the data transmission according to the PCA system is performed between the optical node apparatuses NE_C and NE_D, with respect to the optical channel CH25 among the standby system optical channels CH25 to CH48.

At first in step 21 in the flowchart in FIG. 14, a test signal is respectively sent out to the standby system optical lines corresponding to the optical channels CH25 to CH48, from the optical node apparatus NE_A, being the master station, to the optical node apparatus NE_B. As this test signal, it is possible to use the second test signal (FIG. 4) sent from the second test signal generation circuit 48 in the optical node apparatus NE_A to the standby system optical line via the time slot allocation circuit 43 and the service selector circuit 44-4. At this time, as shown in FIG. 6, an optical signal in which B2 code indicating that the interface unit is under test is set as E2 #2 byte in the TOH, is sent from the optical node apparatus NE_A to the optical node apparatus NE_B via the active system optical line. Note, B1 code in the operation example in FIG. 6 indicates a state of waiting of transmission of B4 or B5 code from the optical node apparatus on the former stage. B4 code indicates that the test for any one of the standby system optical lines is failed (failure in the interface unit or abnormal state of the optical fiber transmission line), and B5 code indicates the success in the test for all standby system optical lines (normal states of the interface unit and the optical fiber transmission line).

Figure 16:
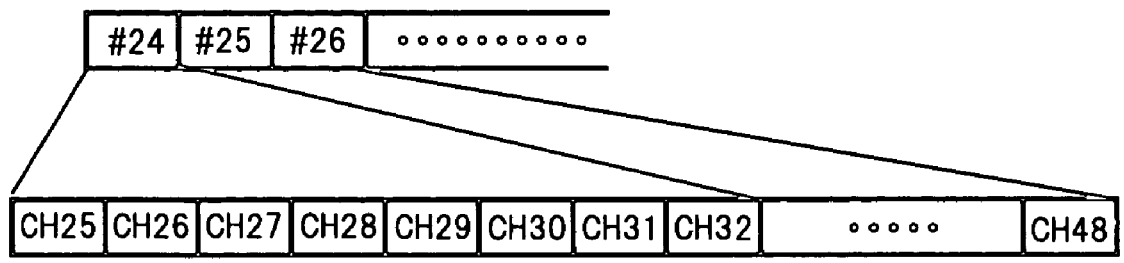
FIG. 16 is a diagram for explaining E2 #24 to 26 bytes in TOH utilized for the standby system diagnosis of the present invention.

Moreover, by utilizing E2 #24 to 26 bytes as shown in FIG. 16 for example, as well as E2 #2 byte in the TOH, information indicating which of the standby system optical channels CH25 to CH48 is added with the test signal, is transmitted from the optical node apparatus NE_A to the optical node apparatus NE_B. Further, by utilizing an undefined code for C2 byte in the pass overhead (POH) in the test signal added to the standby system optical channel, information relating to the allocation of time slot of the test signals corresponding to the respective optical channels is transmitted from the optical node apparatus NE_A to the optical node apparatus NE_B. FIG. 17 is a diagram showing a specific example of C2 code defined in the SONET_GR-253. In this case, information relating to mapping of test signals is transmitted using an undefined M code shown in Item 14.

In step 22, the test signal sent from the optical node apparatus NE_A to the standby system optical line is received in the optical node apparatus NE_B. The reception of the test signal by the optical node apparatus NE_B is performed by utilizing for example the second test signal reception circuit 49 (FIG. 4), and an error detection is sequentially executed for the test signals corresponding to the optical channels CH25 to CH48 sent from the optical node apparatus NE_A. FIG. 18 is a diagram schematically showing a state in steps 21 to 22. PN in the optical node apparatus NE_A in FIG. 18 denotes a functional block for transmitting the test signals onto the standby system optical lines, and DET in the optical node apparatus NE_B denotes a functional block for receiving the test signals propagated on the standby system optical lines. In steps 21 to 22, B2 code (under test) as E2 #2 byte in the TOH and FF code (adding of the test signal) as E2 #24 to 26 bytes, and also M code as C2 byte in the POH, are sent out from the optical node apparatus NE_A to the optical node apparatus NE_B. Further, B1 code (waiting state) as E2 #2 byte in the TOH, and also 00 code (no test signal) as E2 #24 to 26 bytes in the TOH and C2 byte in the POH, are sent out from the respective optical node apparatuses NE_B to NE_D to the optical node apparatuses on the latter stages. By the transmission of overhead information between the respective optical node apparatuses NE_A to NE_D, the respective optical node apparatuses NE_B to NE_D are set to be in the waiting states.

Figure 19:
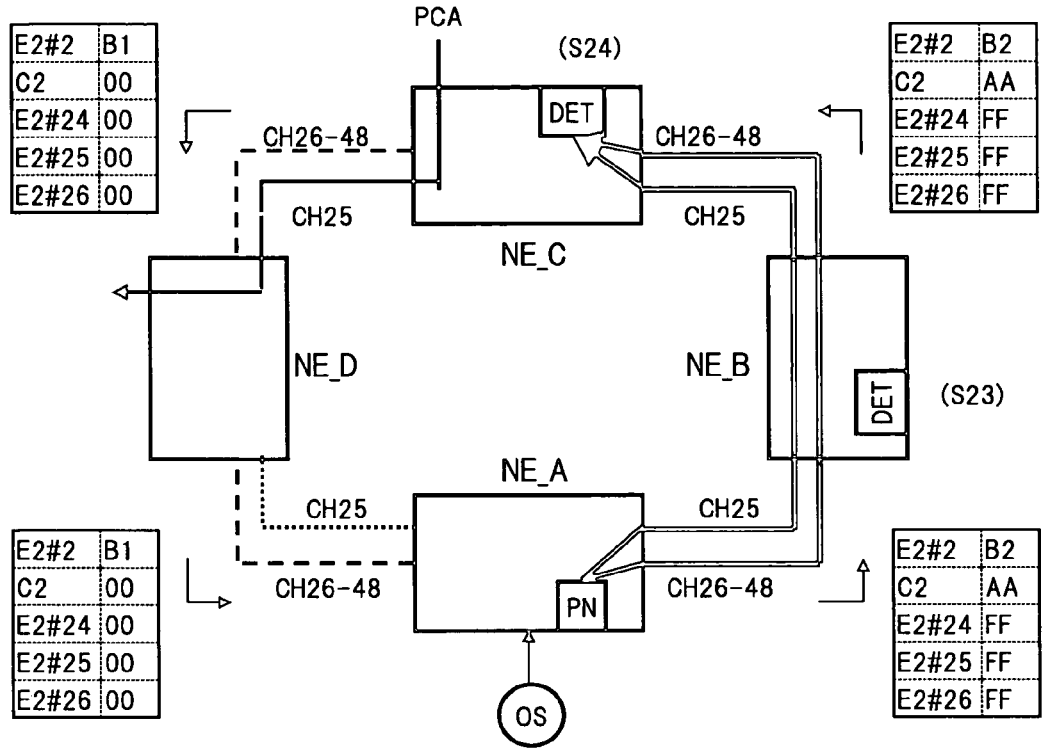
FIG. 19 is a diagram schematically showing the state in steps 23 to 24 in FIG. 14.

When the error detection is finished for the test signals corresponding to the respective optical channels CH25 to CH48 in the optical node apparatus NE_B, then in step 23, the standby system switch unit 20S in the optical node apparatus NE_B is controlled to be switched, so that the respective test signals sent out from the optical node apparatus NE_A pass through the optical node apparatus NE_B to be sent to the optical node apparatus NE_C, as shown in FIG. 19. Then, in step 24, in the optical node apparatus NE_C, the error detection is sequentially executed for the test signals corresponding to the optical channels CH25 to CH48 having passed through the optical node apparatus NE_B. At this time, B2 code as E2 #2 byte in the TOH and FF code as E2 #24 to 26 bytes are sent out from the optical node apparatus NE_B to the optical node apparatus NE_C. Since the test signal generated in the optical node apparatus NE_A is made to pass through, C2 byte in the POH is maintained as AA code. The overhead information sent out from the respective optical node apparatuses NE_A, NE_C and NE_D to the optical node apparatuses on the latter stages, is maintained in the above state.

Figure 20:
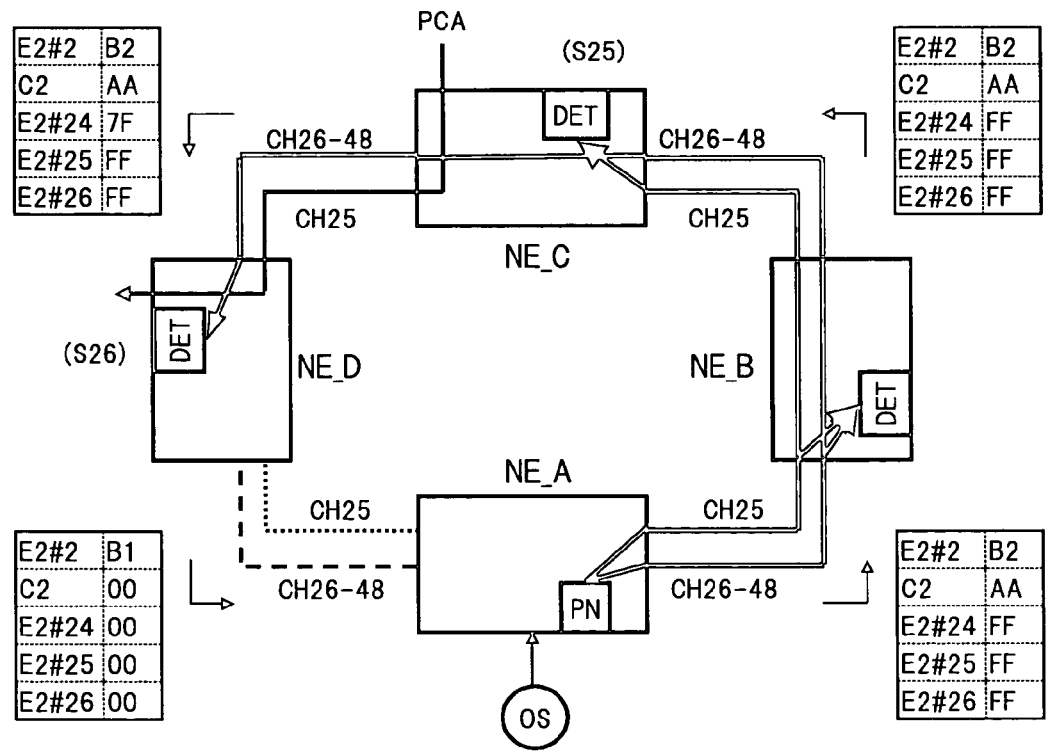
FIG. 20 is a diagram schematically showing the state in steps 25 to 26 in FIG. 14.

When the error detection is finished for the test signals corresponding to the respective optical channels CH25 to CH48 in the optical node apparatus NE_C, then in step 25, the standby system switch unit 20S in the optical node apparatus NE_C is controlled to be switched, so that the respective test signals, which were sent out from the optical node apparatus NE_A and have passed through the optical node apparatus NE_B, pass through the optical node apparatus NE_C to be sent to the optical node apparatus NE_D, as shown in FIG. 20.

At this time, the test signal corresponding to the optical channel CH25 is terminated in the optical node apparatus NE_C, so as not to affect the data transmission according to the PCA system between the optical node apparatuses NE_C and NE_D. Then in step 26, in the optical node apparatus NE_D, the error detection is sequentially executed for the test signals corresponding to the optical channels CH26 to CH48 having passed through the optical node apparatus NE_C. The failure detection in the interface unit and the optical line corresponding to the optical channel CH25 is judged depending on whether or not the data transmission through the PCA optical channel CH25 is being performed normally.

In steps 25 and 26, B2 code as E2 #2 byte in the TOH, 7F code (there is a PCA signal in CH25) as E2 #24 byte, FF code as E2 #25 and 26 bytes, and AA code as C2 byte in the POH are sent out from the optical node apparatus NE_C to the optical node apparatus NE_D. The overhead information sent out from the respective optical node apparatuses NE_A, NE_B and NE_D to the optical node apparatuses on the latter stages maintains the above state.

Figure 21:
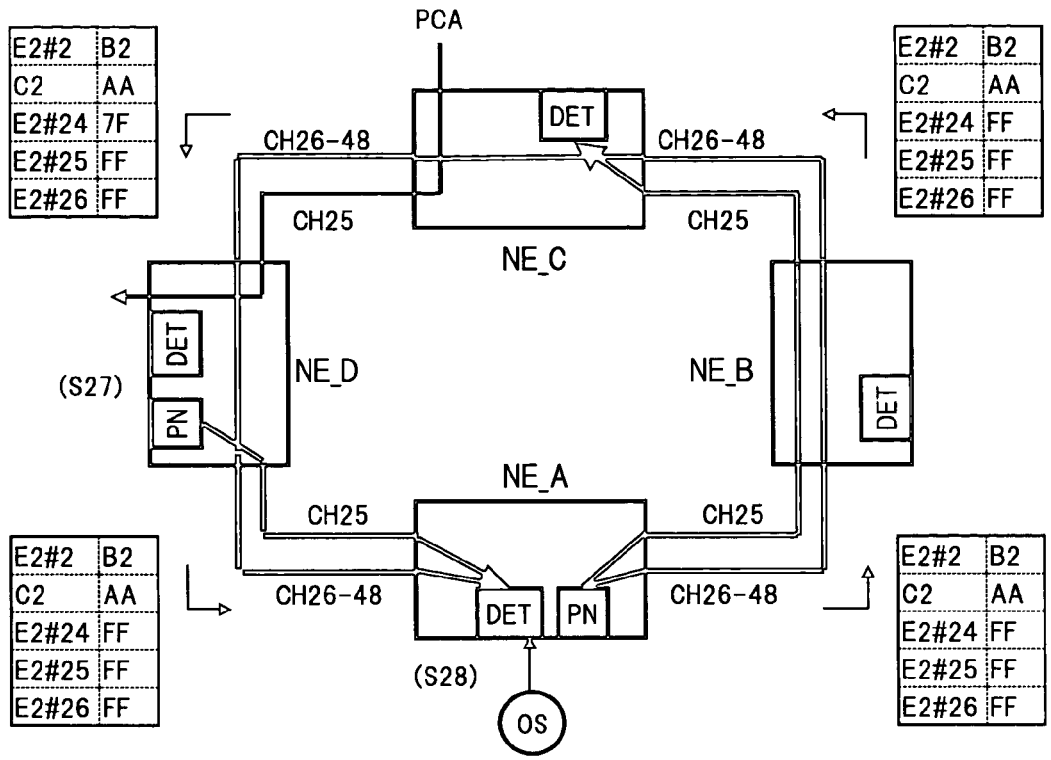
FIG. 21 is a diagram schematically showing the state in steps 27 to 28 in FIG. 14.

When the error detection is finished for the test signals corresponding to the respective optical channels CH26 to CH48 in the optical node apparatus NE_D, then in step 27, as shown in FIG. 21, the standby system switch unit 20S in the optical node apparatus NE_D is controlled to be switched, so that the respective test signals corresponding to the optical channels CH26 to CH48, which were sent out from the optical node apparatus NE_A and have passed through the optical node apparatuses NE_B and NE_C, pass through the optical node apparatus NE_D to be sent to the optical node apparatus NE_A. Moreover, the test signal generated in the optical node apparatus NE_D is sent out to the standby system optical line, corresponding to the optical channel CH25, to be sent to the optical node apparatus NE_A. Then in step 28, in the optical node apparatus NE_A, the error detection is sequentially executed for the test signal corresponding to the optical channel CH25 sent out from the optical node apparatus NE_D and the test signals corresponding to the respective optical channels CH26 to CH48 having passed through the optical node apparatus NE_D. At this time, B2 code as E2 #2 byte in the TOH, FF code as E2 #24 to 26 bytes, and AA code as C2 byte in the POH are sent out from the optical node apparatus NE_D to the optical node apparatus NE_A. Note, the overhead information sent out from the respective optical node apparatuses NE_A to NE_C to the optical node apparatuses on the latter stages is maintained in the above state.

Figure 22:
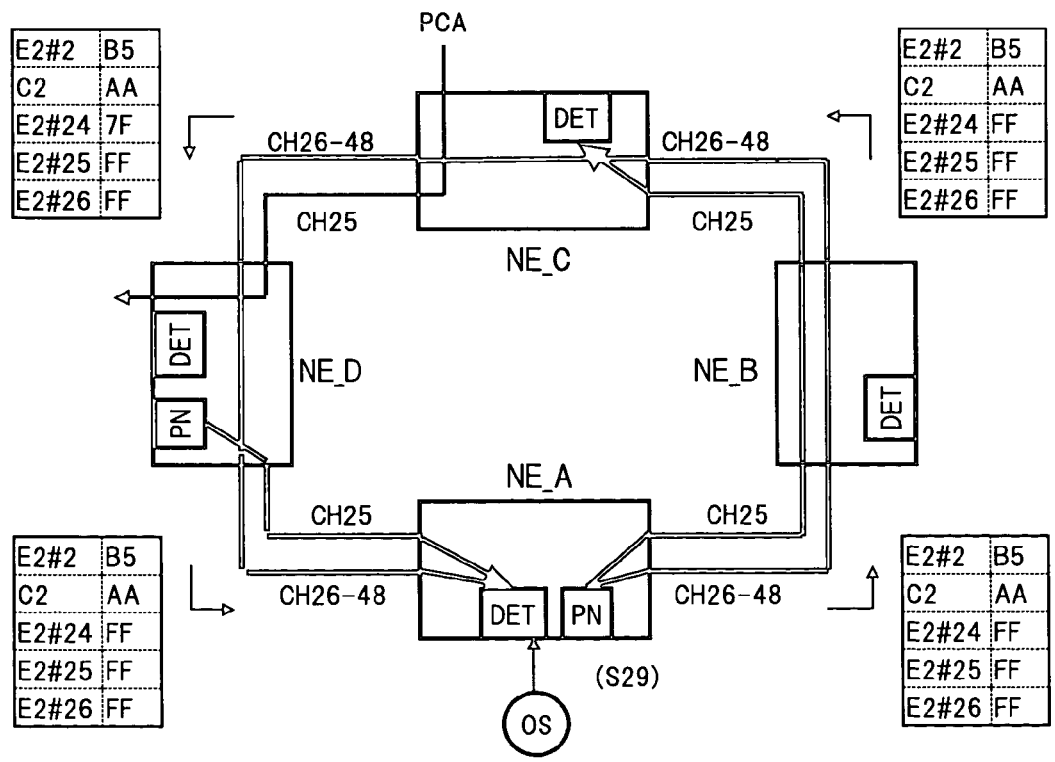
FIG. 22 is a diagram schematically showing the state in step 29 in FIG. 14.

When the error detection is finished for the test signals corresponding to the respective optical channels CH25 to CH48 in the optical node apparatus NE_A, then in step 29, as shown in FIG. 22, B5 code indicating that the tests for the interface units and the standby system optical lines in the respective optical node apparatuses NE_A to NE_D are finished successfully (the interface units and the standby system optical lines are in the normal states) is sent out as E2 #2 byte in the TOH from the optical node apparatus NE_A to the optical node apparatus NE_B. Then, the optical node apparatus NE_B having received B5 code from the optical node apparatus NE_A sends out B5 code to the optical node apparatus NE_C, and subsequently, B5 code is sent out also from the optical node apparatuses NE_C and NE_D.

Figure 23:
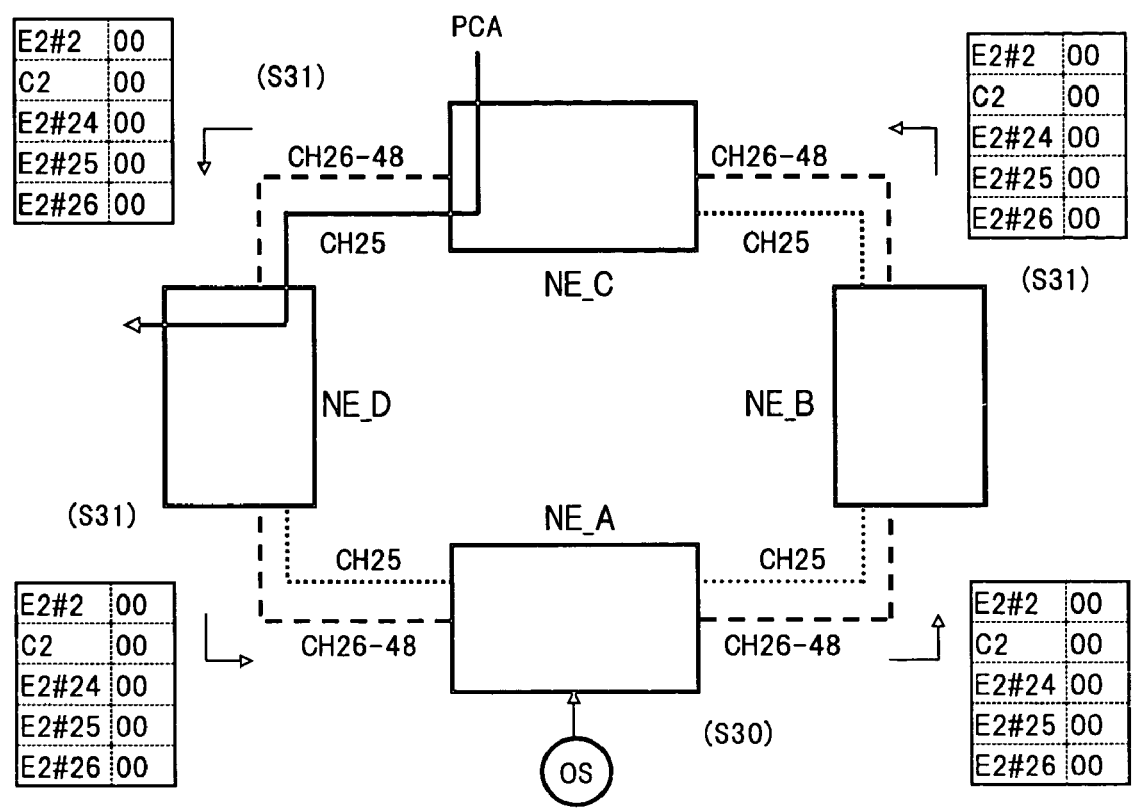
FIG. 23 is a diagram schematically showing the state in steps 30 to 31 in FIG. 14.

When the optical node apparatus NE_A receives B5 code from the optical node apparatus NE_D, then in step 30, as shown in FIG. 23, 00 code indicating that the failure detections of the interface units and the standby system optical lines in the whole optical network are finished, is sent out as E2 #2 byte in the TOH from the optical node apparatus NE_A to the optical node apparatus NE_B. Moreover, at the same time, the sending of the test signals from the optical node apparatus NE_A is stopped. By the sending of 00 code from the optical node apparatus NE_A, in step 31, the standby system diagnosis state of each of the optical node apparatuses NE_A to NE_D having received 00 code is sequentially released.

By applying the diagnosis method for standby systems according to the present invention to the optical ring network in the above manner, then even during operation of the active system, the operation states of the switch units 20 and the interface units 10 in the respective optical node apparatuses, and the states of the standby system optical lines connecting the optical node apparatuses can be reliably diagnosed, thereby enabling the confirmation of the normal state of the standby system before the occurrence of failure in the active system. Moreover, by only giving the diagnosis operation command to an arbitrary optical node apparatus, the failure detections for all optical node apparatuses on the ring network can be automatically performed. As a result, it becomes possible to realize reliably and easily the line relief at the time when a failure occurs in the optical ring network having the redundant configuration, thereby enabling the improvement in the reliability of the optical ring network. Moreover, even when the data transmission according to the PCA system is being performed, since the state of the standby system optical line can be diagnosed without interrupting the PCA line under operation, the large capacity data transmission can be realized.

In the above embodiment, the example in which 24-wave optical channels are respectively allocated to the active system and the standby system has been described, but the allocation of the optical channels in the present invention is not limited to this example. For example, the present invention is also applicable to various types of allocation of the optical channels as defined in the SONET and the like. Moreover, the operation of the counterclockwise ring has been described, but the operation of the clockwise ring can be considered in the same way as for the counterclockwise ring. Furthermore, the 2F-BLSR type network configuration, in which the plurality of optical node apparatuses are connected in a ring form by two optical fiber transmission lines, has been illustrated herein. However, the applicability of the diagnosis method for standby systems of the present invention is not limited to the 2F-BLSR type optical ring network, and the present invention is applicable to other optical ring networks having known configurations.

What is claimed is:

1. A diagnosis method for standby systems, in an optical ring network comprising a plurality of optical transmission apparatuses each having a redundant configuration including an active system unit and a standby system unit, in which a plurality of optical transmission lines through which an active system optical channel and a standby system optical channel can be propagated, is used to connect adjacent optical transmission apparatuses, of said plurality of optical transmission apparatuses, to each other, to form a ring-shaped optical communication network, for diagnosing whether or not data transmission using said standby system optical channel can be performed normally, during data transmission between said respective optical transmission apparatuses using said active system optical channel, the method comprising giving a command for starting the standby system diagnosis to any one of said plurality of optical transmission apparatuses;

generating by said optical transmission apparatus having received said command a false signal different from a data signal under operation in its own apparatus, providing said false signal to the standby system unit in its own apparatus, detecting based on a transmission state of said false signal whether or not said standby system unit is operating normally, and transmitting information indicating the detection result to the optical transmission apparatus on the downstream side, by utilizing a predetermined region in the active system optical channel under operation;

generating by said optical transmission apparatus on the downstream side a false signal different from a data signal under operation in its own apparatus, after confirming that the standby system unit in the optical transmission apparatus on the upstream side is operating normally, according to data in the predetermined region in said active system optical channel, providing the false signal to the standby system unit in its own apparatus, detecting based on the transmission state of the false signal whether or not said standby system unit is operating normally, updating the data in the predetermined region in said active system optical channel under operation corresponding to the detection result, and transmitting the data to the optical transmission apparatus on the further downstream side; and confirming by said optical transmission apparatus having received said command normal operations of the standby system units in all optical transmission apparatuses on the ring network, according to the data in the predetermined region in the active system optical channel, which has made a round of the ring network, and outputting information indicating the finish of the standby system diagnosis.

2. An optical transmission apparatus used in a diagnosis method for standby systems, in an optical ring network comprising a plurality of optical transmission apparatuses each having a redundant configuration including an active system unit and a standby system unit, in which a plurality of optical transmission lines through which an active system optical channel and a standby system optical channel can be propagated, is used to connect adjacent optical transmission apparatuses, of said plurality of optical transmission apparatuses, to each other, to form a ring-shaped optical communication network, for diagnosing whether or not data transmission using said standby system optical channel can be performed normally, during data transmission between said respective optical transmission apparatuses using said active system optical channel, wherein a command for starting the standby system diagnosis is given to any one of said plurality of optical transmission apparatuses;

said optical transmission apparatus having received said command generates a false signal different from a data signal under operation in its own apparatus, provides said false signal to the standby system unit in its own apparatus, detects based on a transmission state of said false signal whether or not said standby system unit is operating normally, and transmits information indicating the detection result to the optical transmission apparatus on the downstream side, by utilizing a predetermined region in the active system optical channel under operation;

said optical transmission apparatus on the downstream side generates a false signal different from a data signal under operation in its own apparatus, after confirming that the standby system unit in the optical transmission apparatus on the upstream side is operating normally, according to data in the predetermined region in said active system optical channel, provides the false signal to the standby system unit in its own apparatus, detects based on the transmission state of the false signal whether or not said standby system unit is operating normally, updates the data in the predetermined region in said active system optical channel under operation corresponding to the detection result, and transmits the data to the optical transmission apparatus on the further downstream side; and said optical transmission apparatus having received said command confirms normal operations of the standby system units in all optical transmission apparatuses on the ring network, according to the data in the predetermined region in the active system optical channel, which has made a round of the ring network, and outputs information indicating the finish of the standby system diagnosis, said optical transmission apparatus comprising:

a first interface unit to which an optical transmission line connected to one side of an adjacent optical transmission apparatus is connected;

a second interface unit to which an optical transmission line connected to the other side of the adjacent optical transmission apparatus is connected;

an active system switch unit and a standby system switch unit that perform switching between an active system optical channel and a standby system optical channel transmitted between said first and second interface units;

a control unit that controls a switching operation between said active system optical channel and said standby system optical channel;

false signal transmission means for transmitting a false signal different from a data signal under operation; and false signal reception means for receiving said false signal, wherein at the time of standby system diagnosis, the false signal transmitted from said false signal transmission means passes through said standby system switch unit, is received by said false signal reception means, and, according to a reception state of said false signal, it is determined whether or not said standby system switch unit operates normally.

3. The optical transmission apparatus according to claim 2, further comprising:

a third interface unit to which an optical transmission line connected to the outside of the ring network is connected, and said active system switch unit and standby system switch unit perform the switching between the active system optical channel and the standby system optical channel transmitted between said first to third interface units, and at the time of said standby system diagnosis, said false signal is also transmitted to a signal transmission path corresponding to said third interface in said standby system switch unit.

4. The diagnosis method for standby systems according to claim 1, wherein said predetermined region in the active system optical channel under operation is an unused data region included in a transport overhead.

5. The optical transmission apparatus according to claim 2, wherein said optical transmission apparatus having received a command confirms the normal operations of the standby system switch units in all optical transmission apparatuses on the ring network, and then, sends out its false signal generated by said false signal transmission means to an optical transmission apparatus on the downstream side by utilizing said standby system optical channel, and also transmits information relating to the sent out false signal to the optical transmission apparatus on the downstream side, by utilizing the predetermined region in the active system optical channel under operation;

said optical transmission apparatus on the downstream side receives the false signal sent from the optical transmission apparatus on the upstream side by utilizing the standby system optical channel, according to the data in the predetermined region in said active system optical channel, detects based on the reception state of said false signal whether or not the interface unit and the optical transmission line corresponding to the standby system optical channel between said optical transmission apparatus on the upstream side and its own apparatus are in the normal states, updates the data in the predetermined region in said active system optical channel under operation corresponding to the detection result, and then transmits the data to the optical transmission apparatus on the further downstream side, and said optical transmission apparatus having received said command confirms the normal states of the interface unit and the optical transmission line corresponding to the standby system optical channel between all optical transmission apparatuses on the ring network, according to the data in the predetermined region in said active system optical channel, which has made a round of the ring network, and outputs information indicating the finish of the standby system diagnosis.

6. The optical transmission apparatus according to claim 5, wherein under a condition that an active data transmission according to a protection channel access system is being performed by utilizing a part of said standby system optical channel during operation of the active system, each of the optical transmission apparatuses utilizes a second standby system optical channel, to send out its false signal to the optical transmission apparatus on the downstream side, and also transmits information relating the second standby system optical channel used for the sending of its false signal, to the optical transmission apparatus on the downstream side by utilizing the predetermined region in the part of the standby system optical channel that is transmitting the active data.

7. The optical transmission apparatus according to claim 6, wherein said predetermined region in the standby system optical channel is an unused data region included in a pass overhead.

8. The diagnosis method according to claim 1, wherein the diagnosis method is performed in a ring network.

9. The diagnosis method for standby systems according to claim 1, wherein said optical transmission apparatus having received said command confirms the normal operations of the standby system units in all optical transmission apparatuses on the ring network, and then, sends out its false signal to the optical transmission apparatus on the downstream side, and also transmits information relating to the sent out false signal to the optical transmission apparatus on the downstream side, by utilizing the predetermined region in the active system optical channel under operation; and said optical transmission apparatus on the downstream side receives the false signal sent from the optical transmission apparatus on the upstream side by utilizing the standby system optical channel, and according to the data in the predetermined region in said active system optical channel, detects based on the reception state of said false signal whether or not an interface unit and the optical transmission line corresponding to the standby system optical channel between said optical transmission apparatus on the upstream side and its own apparatus are in the normal states, updates the data in the predetermined region in said active system optical channel under operation corresponding to the detection result, and then transmits the data to the optical transmission apparatus on the further downstream side.

10. The diagnosis method for standby systems according to claim 9, wherein under a condition that an active data transmission according to a protection channel access system is being performed by utilizing a part of said standby system optical channel during operation of the active system, each of the optical transmission apparatuses utilizes a second standby system optical channel, to send out its false signal to the optical transmission apparatus on the downstream side, and also transmits information relating the second standby system optical channel used for the sending of its false signal, to the optical transmission apparatus on the downstream side by utilizing the predetermined region in the part of the standby system optical channel that is transmitting the active data.

11. The diagnosis method for standby systems according to claim 10, wherein said predetermined region in the standby system optical channel is an unused data region included in a pass overhead.

* * * * *